(12) United States Patent
Matsumoto et al.

(10) Patent No.: US 7,744,498 B2
(45) Date of Patent: Jun. 29, 2010

(54) STRUCTURE OF TRANSMISSION FOR BICYCLE

(75) Inventors: Shinya Matsumoto, Saitama (JP); Kazunari Iguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1045 days.

(21) Appl. No.: 11/052,915

(22) Filed: Feb. 9, 2005

(65) Prior Publication Data
US 2005/0176537 A1    Aug. 11, 2005

(30) Foreign Application Priority Data
Feb. 10, 2004    (JP) ............... 2004-068101

(51) Int. Cl.
*F16H 61/00*    (2006.01)
*B62M 25/00*    (2006.01)

(52) U.S. Cl. ............... 474/80; 474/78; 474/79; 474/81; 474/160

(58) Field of Classification Search .......... 474/80, 474/78, 79, 81, 160
See application file for complete search history.

(56) References Cited

U.S. PATENT DOCUMENTS

| | | | | |
|---|---|---|---|---|
| 4,323,357 A | * | 4/1982 | Nagano | 474/82 |
| 4,376,394 A | * | 3/1983 | Lapeyre | 74/337.5 |
| 4,838,837 A | * | 6/1989 | Testa | 474/80 |
| 4,840,605 A | * | 6/1989 | Testa | 474/80 |
| 5,167,591 A | | 12/1992 | Cowan | |
| 5,404,768 A | * | 4/1995 | Hwang et al. | 74/371 |
| 5,611,556 A | * | 3/1997 | Davidow | 280/236 |
| 5,667,233 A | * | 9/1997 | Metzinger | 280/238 |
| 5,873,590 A | * | 2/1999 | Abe et al. | 280/259 |
| 6,042,495 A | * | 3/2000 | Patterson et al. | 474/80 |
| 2003/0096669 A1 | | 5/2003 | Kawakami | |
| 2004/0014543 A1 | * | 1/2004 | Van Der Linde | 474/160 |

FOREIGN PATENT DOCUMENTS

| | | |
|---|---|---|
| EP | 1 366 978 A1 | 12/2003 |
| EP | 1 462 353 A1 | 9/2004 |
| JP | 59-2986 A | 1/1984 |
| JP | 05-231504 | 9/1993 |
| JP | 2004 504229 | 2/2004 |
| WO | WO 01/15963 A1 | 3/2001 |

* cited by examiner

*Primary Examiner*—Bradley T King
*Assistant Examiner*—Mahbubur Rashid
(74) *Attorney, Agent, or Firm*—Birch, Stewart, Kolasch & Birch, LLP

(57) ABSTRACT

To achieve downsizing and weight reduction of a derailleur shaft and the mounting structure thereof and to improve the rigidity of the derailleur shaft without increasing the thickness thereof more than necessary. A transmission case is divided into left and right halves, and the left and right halves are provided with bosses therein having holes opposing each other. The bosses are brought into abutment with each other and united by fitting tightening bolts to the holes of the bosses and tightening the same. A sleeve-shaped derailleur shaft is fitted on the outer periphery of the bosses to support and mount the derailleur shaft. The derailleur shaft includes a hole at the shaft end thereof. A mounting position of the derailleur shaft is achieved by a pin inserted into the hole and a hole provided on one of the cases.

15 Claims, 19 Drawing Sheets

STRUCTURE OF TRANSMISSION FOR BICYCLE

CROSS-REFERENCE TO RELATED APPLICATIONS

This non-provisional application claims priority under 35 U.S.C. §119(a) on Patent Application No. 2004-068101, filed in Japan on Feb. 10, 2004, the entirety of which is incorporated herein by reference.

BACKGROUND OF THE INVENTION

1. Field of the Invention

The present invention relates to a structure of a transmission for a bicycle including a derailleur. In particular, the present invention relates to an improved structure of a transmission for a bicycle characterized by the mounting structure of the derailleur in the transmission.

2. Description of Related Art

In the related art, a transmission for a bicycle provided with a derailleur is known. The derailleur has a supporting arm with a pantograph mechanism, which is adapted to shift a power transmission chain wound around a multi-stage sprocket wheel supported by a rear wheel hub and mounted to the rear wheel hub via a shaft step-by-step is known. The derailleur is provided with a guiding ring for shifting the chain and a tension ring for providing tension to the chain. The supporting arm, which is formed of a pantograph mechanism having a pair of links, supports a derailleur shaft of the derailleur. This support of the derailleur shaft has a substantially cantilevered structure (for example, see JP-A-59-2986, pages 1-2 and FIGS. 1-2).

The above-described document discloses a derailleur 05 of a transmission for a bicycle. The derailleur 05 has a supporting arm 04 of a pantograph mechanism, which is adapted to shift a power transmission chain 03 wound around a multi-stage sprocket wheel 02 supported by a rear wheel hub 01 and mounted to the rear wheel hub 01 via a shaft step-by-step. The derailleur 05 includes a shifting frame 09 having a guide ring 07 supported to the distal end of the supporting arm 04 of a pantograph type via a movable member 06 for shifting the chain. A tension ring 08 provides tension to the chain. The shifting frame 09, which constitutes a substantial body of the derailleur 05, is cantilevered by the movable member (derailleur shaft) 06.

According to the cantilever supporting structure of the derailleur (shifting frame) as disclosed in the above document, sufficient rigidity of the derailleur shaft (movable member) is difficult to secure. In order to secure sufficient rigidity, it is necessary to enforce the rigidity of the derailleur shaft itself. In order to do so, countermeasures such as increasing the thickness of the derailleur shaft have to be taken. However, when such a countermeasure is taken, increase in weight is inevitable, whereby upsizing of the derailleur shaft mounting structure itself cannot be avoided.

SUMMARY OF THE INVENTION

It is an object of the present invention to solve such a problem, and to provide an improved structure of the derailleur shaft mounting structure in which the above-described problem is solved by exercising specific ingenuity in the derailleur shaft mounting structure.

The present invention, having solved the above-described problem, relates to an improved structure in a transmission for a bicycle in which mounting rigidity of the shaft is improved by employing a mounting structure in which the derailleur shaft is rigid. The shaft is, in a structure including a derailleur-type transmission fixed to a vehicle body, a structure of a transmission for a bicycle including a derailleur-type transmission being fixed to the vehicle body, wherein the transmission is disposed within a transmission case which can be divided into left and right halves, the left and right halves of the transmission case are provided with bosses coaxially projecting inwardly of the transmission case respectively, and the derailleur shaft of the transmission is supported by the left and right bosses. The left and right bosses are formed with holes therein, and the left and right halves of the transmission case are connected via a connecting member fitted to the holes.

According to a further aspect of the present invention, the derailleur shaft is disposed substantially at the same distance from a plurality of frame members extending from a head pipe of the vehicle body rearward and downward in side view.

In the present invention, in a structure including a derailleur-type transmission fixed to a vehicle body, since the transmission is disposed within a transmission case which can be divided into left and right halves, the left and right halves of the transmission case are provided with bosses coaxially projecting inwardly of the transmission case respectively. A derailleur shaft of the transmission is supported by the left and right bosses. The derailleur shaft can be supported from both sides and hence the mounting rigidity of the derailleur shaft is enhanced. In addition, the mounting of the shaft is stabilized, a necessity to increase the thickness of the derailleur shaft is eliminated and hence a lightweight shaft is achieved. Therefore, downsizing and weight reduction of the mounting structure of the derailleur shaft itself is achieved.

The stable state can be secured even when a deviated load is exerted during speed-change operation owing to the enhancement of rigidity of the mounting structure of the derailleur shaft. Therefore, operability during the speed-change operation can be improved. In addition, the connecting portion between the left and right halves of the transmission case can also be used as the supporting portion of the derailleur shaft.

In the present invention, the left and right bosses are formed with the holes therein. The connecting member fitted in the holes connects the left and right halves of the transmission case. Therefore, the left and right halves of the case are strongly connected to each other via both bosses with the connecting member fitted into the holes of the left and right bosses. The derailleur shaft is supported by both of the strongly connected bosses. The rigidity of the supporting portion is increased, and hence the derailleur shaft is supported in an extremely and strongly stable state irrespective of its simple supporting structure.

In the present invention, the derailleur shaft is disposed substantially at the same distance from a plurality of frame members extending from a head pipe of the vehicle body rearward and downward in side view. Therefore, the connecting member is located at the position where connecting rigidity between the left and right halves of the transmission case is required. In view of this, the connecting member can also be used for supporting the derailleur shaft while securing case rigidity, and cost reduction can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 10(a)-10(c) are drawings of the entire structure of the derailleur, in which FIG. 10(a) is the entire structure of the derailleur partly in cross-section, FIG. 10(b) is a cross-sectional view taken along the line 10B-10B in FIG. 10(a), and FIG. 10(c) is a cross-sectional view taken along the line 10C-10C in FIG. 10(b);

FIGS. 12(a)-12(c) are drawings showing a structure of the derailleur shaft in which FIG. 12(a) is a side view partly in cross-section, FIG. 12(b) is an end view partly in cross-section, and FIG. 12(c) is a drawing viewed in the direction indicated by an arrow A in FIG. 12(a);

FIGS. 13(a)-13(e) show a structure of a derailleur arm and a mounting structure of an operating cable to the arm, in which FIG. 13(a) is a plan view of the arm partly in cross-sectional view, FIG. 13(b) is a cross-sectional view taken along the line 13B-13B in FIG. 13(a), FIG. 13(c) is a drawing viewed in the direction indicated by an arrow B in FIG. 13(e), FIG. 13(d) is an end view of the arm, and FIG. 13(e) is a cross-sectional view taken along the line 13E-13E in FIG. 13(d);

FIGS. 14(a)-14(b) show a structure of a derailleur body, in which FIG. 14(a) is a cross-sectional view taken along the line 14A-14A in FIG. 14(b), and FIG. 14(b) is a plan view;

FIGS. 16(a)-16(b) show a chain guide member, in which FIG. 16(a) is a side view of the chain guide member, and FIG. 16(b) is an upper view of the chain guide member;

FIGS. 17(a)-17(b) show a chain tension adjusting mechanism, in which FIG. 17(a) is a view showing a mounting state to the rear portion of a mainframe, and FIG. 17(b) is a cross-sectional view taken along the line 17A-17A in FIG. 17(a);

FIGS. 19(a)-19(b) are views showing as a cross-section a principal portion of a derailleur in the related art, in which FIG. 19(a) is a front view, and FIG. 19(b) is a side view.

DETAILED DESCRIPTION OF THE PREFERRED EMBODIMENTS

Referring now to FIGS. 1 to 18, embodiments of a structure of a transmission for a bicycle provided with a derailleur according to the present invention will be described.

Figure 1:
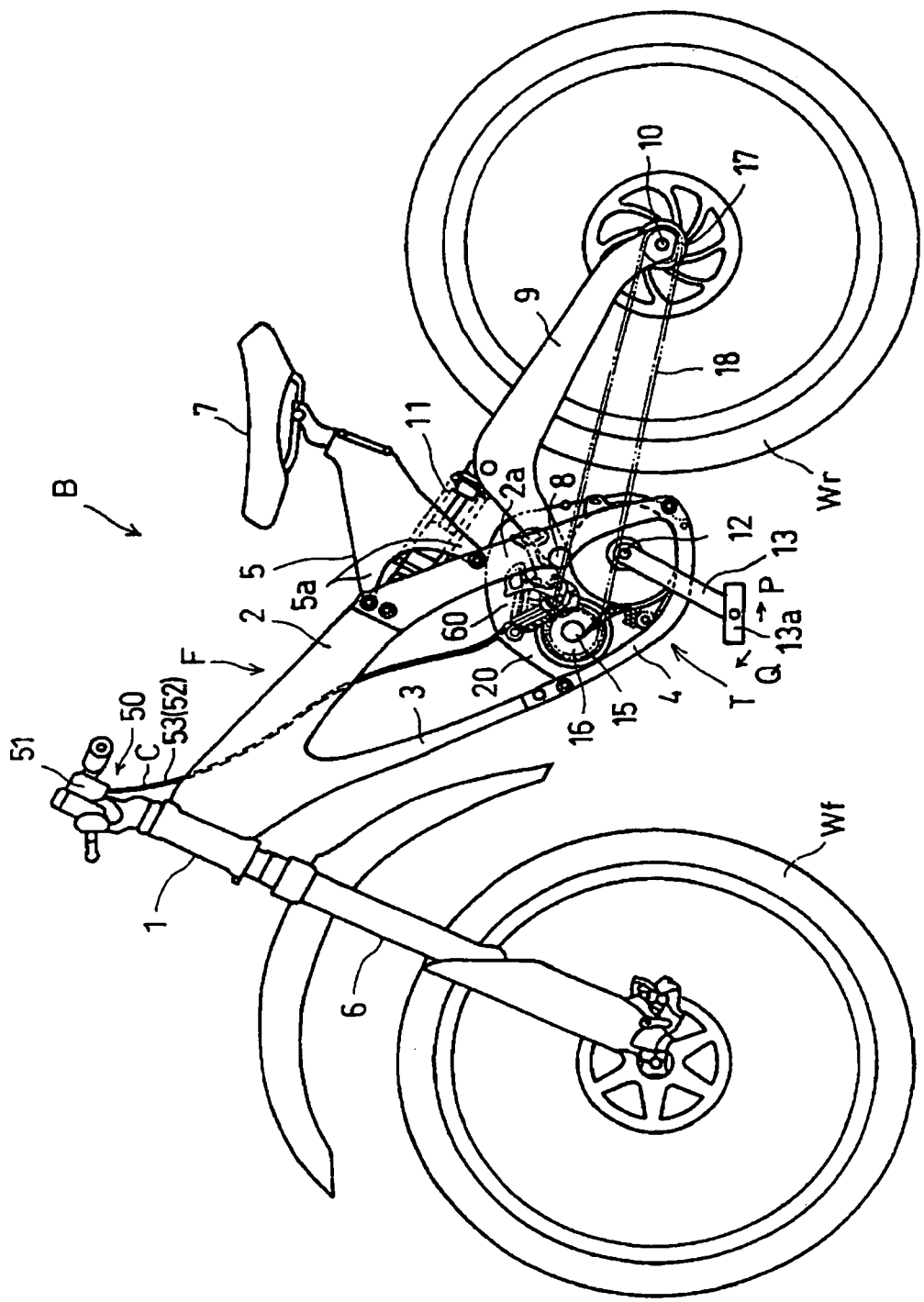
FIG. 1 is a schematic left side view of a bicycle according to an embodiment of the present invention.

FIG. 1 is a left side view of a bicycle B in which a transmission T having a derailleur is used according to the present invention.

The bicycle B is a downhill bicycle, and is used, for example, for competitive sports that are timed for running down a dirt course, such as a forest road provided with a high-speed corner or a jumping section.

Figure 2:
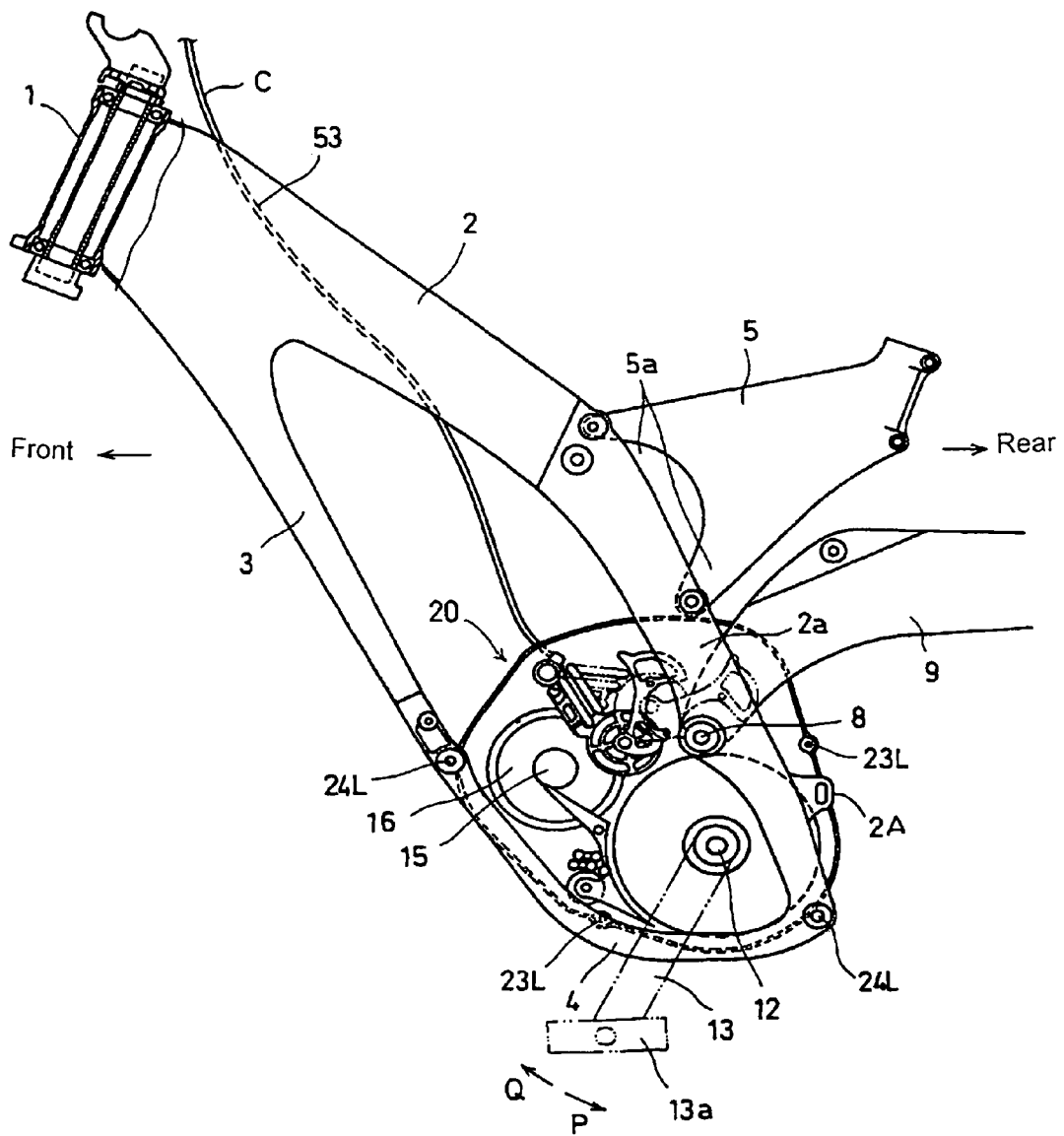
FIG. 2 is a drawing showing a principal portion of a frame and a state of suspending a case.

A vehicle body frame F of the bicycle B includes, as shown in FIGS. 1 and 2, a pair of left and right mainframes 2 extending from a head pipe 1 rearward and obliquely downward. A down tube 3 extends from the front lower ends of both mainframes 2 rearward and obliquely downward. The lower ends of a pair of the mainframes 2 and the lower end of the down tube 3 are connected to each other via an under tube 4. A saddle frame 5 is provided so as to extend rearward from the centers of the respective mainframes 2 in pair.

The above-described saddle frame 5 for supporting a saddle 7 is supported by the mainframes 2 by fixing a front end arm portion 5a to the centers of the mainframes 2 via a bolt. The above-described head pipe 1 steerably supports a pair of left and right front forks 6, and a front wheel Wf is journaled at the lower ends of the front forks 6.

In this specification, terms "up and down", "front and rear", and "left and right" represent directions with reference to the bicycle B, and correspond to the "up and down", "front and rear", and "left and right" of the bicycle respectively. The side view means to view from the left or right.

As shown in FIGS. 1 and 2, front ends of a pair of left and right swing arms 9 are journaled by a pivot shaft 8 provided at the rear of the left and right mainframes 2 shown in FIG. 1 so as to be adjacent to the respective inner surfaces of a pair of the left and right mainframes 2, and a rear wheel Wr is journaled between a pair of the left and right swing arms 9 at the rear ends thereof via an axle 10. A pair of the left and right swing arms 9 are connected to the above-described pair of left and right mainframes 2 via a suspension 11 having a compression spring and a damper, and hence are capable of swinging motion in the vertical direction about the pivot shaft 8.

A crankshaft 12 and a power transmission device including a transmission T and a drive force transmission mechanism to the rear wheel Wr are mounted to the bicycle B. As shown in FIGS. 1 and 2, the crankshaft 12 and the transmission T are disposed below the vehicle body frame F, and between the vehicle body frame F and the under tube 4 connecting the rear portions of both mainframes 2, and the rear portion of the down tube 3, that is, the lower portion of the mainframe 2 and the lower end of the down tube 3. A drive force transmitting mechanism including a mechanism for transmitting drive force from the transmission T to the rear wheel Wr, that is, a rear wheel drive sprocket 16, a rear wheel driven sprocket 17, and an endless rear wheel drive chain 18 wound around the both sprockets 16, 17 is disposed on the right side of the bicycle B, and on the right side with respect to the center line extending along the widthwise center of the vehicle body.

Figure 3:
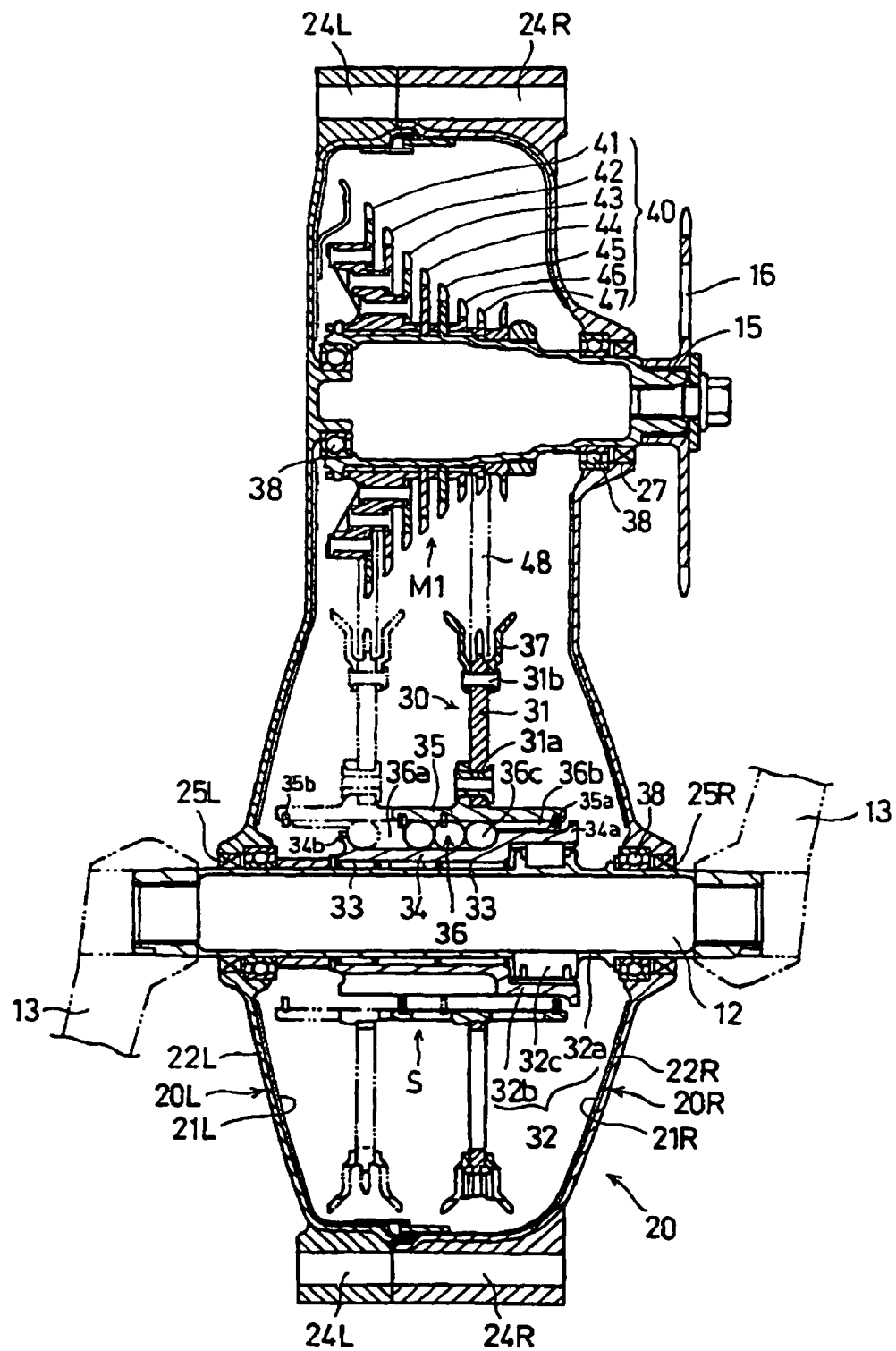
FIG. 3 is a cross-sectional view taken along the line III-III in FIG. 6.
Figure 4:
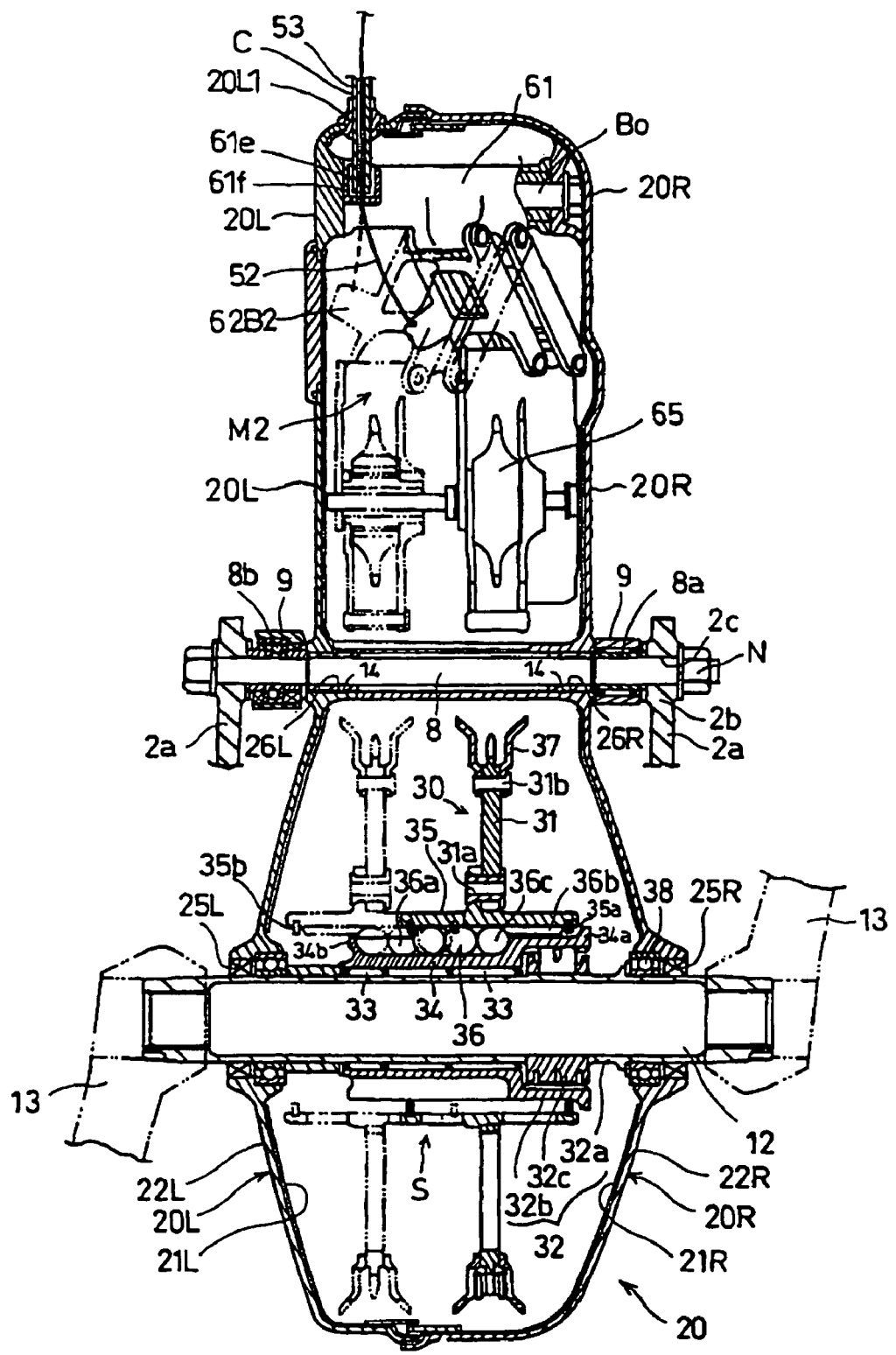
FIG. 4 is a cross-sectional view taken along the line IV-IV is FIG. 6.
Figure 5:
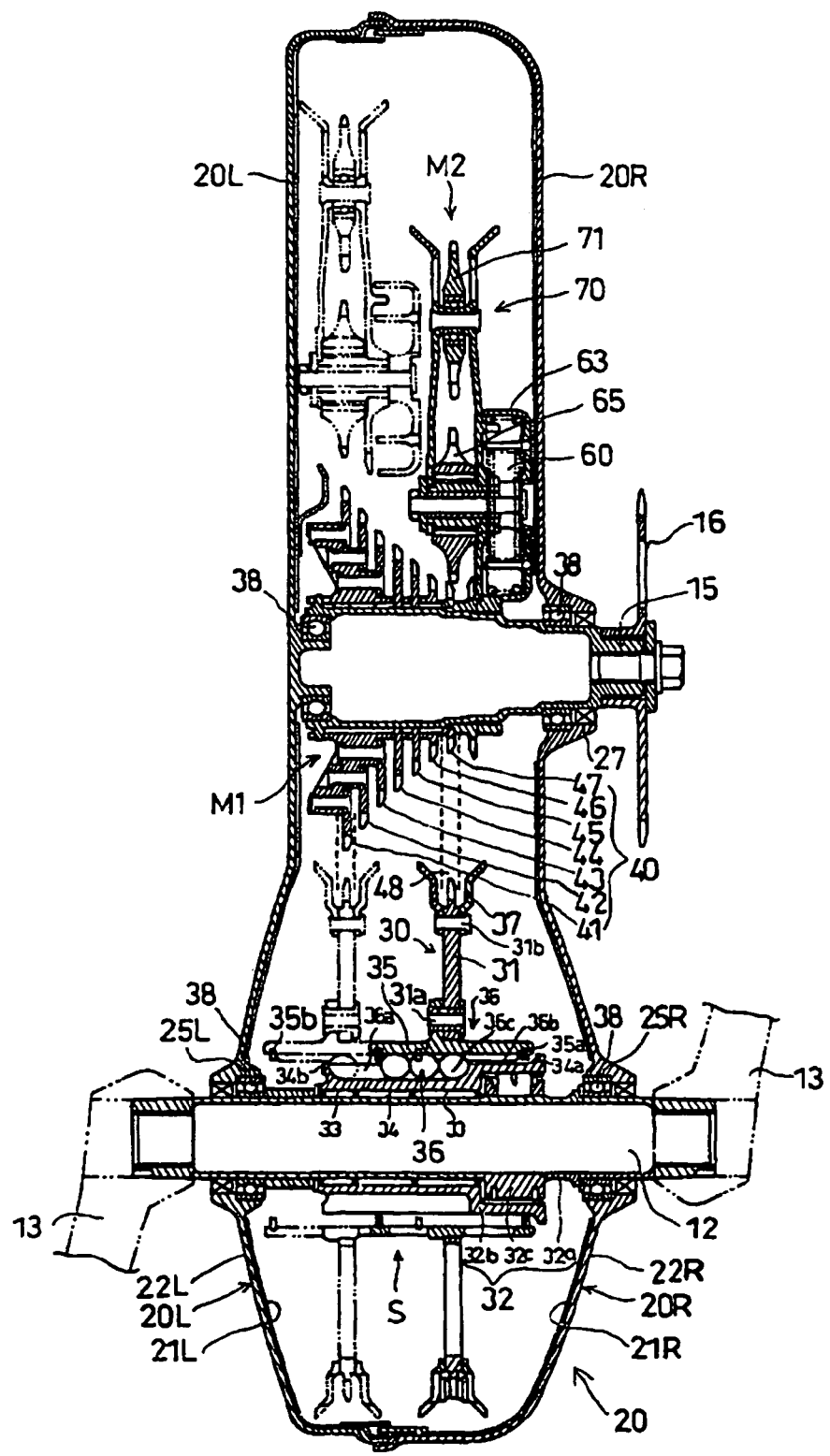
FIG. 5 is a cross-sectional view taken along the line V-V in FIG. 6.

As shown in FIGS. 3, 4 and 5, a case 20 of the transmission T includes a left case 20L and a right case 20R and is configured by combining the left and right halves. The left and right cases 20L, 20R each include a left cover 21L and a right cover 21R formed of CFRP (Carbon Fiber Reinforced Plastic) for covering an internal device, and a left reinforcing member 22L and a right reinforcing member 22R formed of aluminum alloy for reinforcing the left and right covers 21L, 21R from the outside. The left cover 21L is adhered to the inside of the left reinforcing member 22L and the right cover 21R is adhered to the inside of the right reinforcing member 22R, respectively.

The left and right covers 21L, 21R abut against each other at the mating portions thereof via a sealing member, and are integrated by being tightened to each other by bolts, not shown, inserted into bolt holes 23L, 23R, 24L, 24R (only 24L, 24R are shown in FIG. 3) at the peripheral projecting portions of the left and right reinforcing members 22L, 22R on both sides of the mating portions.

Figure 6:
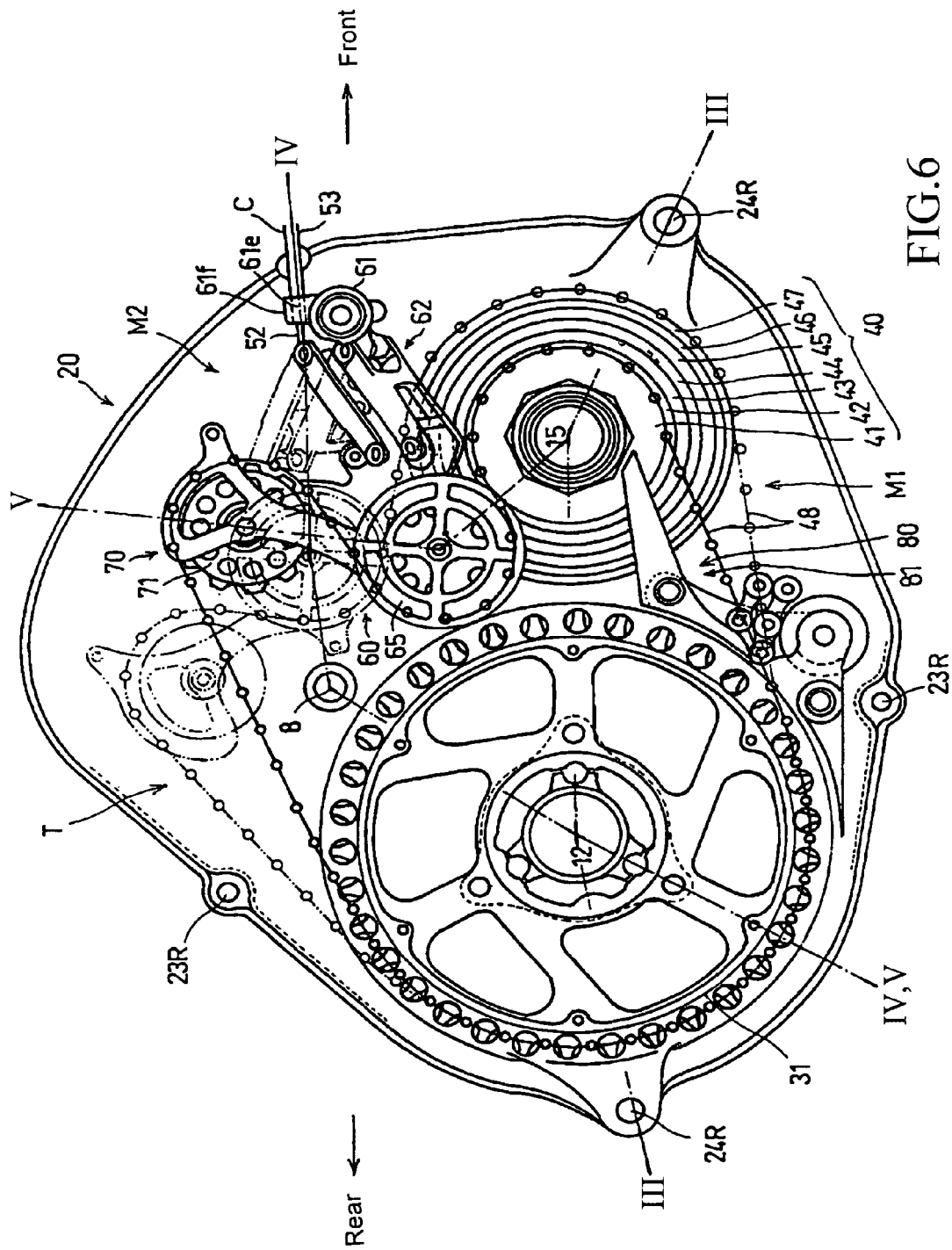
FIG. 6 is a right-side view of the interior of a transmission T with part of a right cover removed.

The two bolt holes 23L, 23L and 23R, 23R (only 23R on the side of the right case is shown in FIG. 6), provided on the left and right cases 20L, 20R are bolt holes for combining and joining the left and right reinforcing members 22L, 22R.

The two bolt holes 24L, 24L and 24R, 24R (only 24R on the side of the right case is shown in FIG. 6) formed on the left and right cases 20L, 20R are bolt holes for combining and tightening the left and right reinforcing members 22L, 22R to each other and mounting the cases 20L, 20R to the frame F. The front bolt holes 24L, 24R are provided for being tightened together with the under tube 4 connected to the lower end of the down tube 3 by the bolt B, and the rear bolt holes 24L, 24R are provided for being tightened together with the rear lower ends of the mainframes 2 by the bolt B.

Then, on the lower portion of the left and right reinforcing members 22L, 22R of the case 20, as shown in FIGS. 3, 4 and 5, crankshaft bearing holes 25L, 25R are formed respectively, and the crankshaft 12 passes through the crankshaft bearing holes 25L, 25R in the lateral direction. At the position upwardly of the crankshaft bearing holes 25L, 25R, pivot shaft bearing holes 26L, 26R, through which the pivot shaft 8 passes, are formed (See FIG. 4).

The left and right reinforcing members 22L, 22R as described above are joined with the left and right covers 21L, 21R and tightened by bolts to constitute the case 20 of the transmission T, and is suspended from the vehicle body frame F.

As shown in FIGS. 3, 4 and 5, the crankshaft 12, which is a pedal-type crankshaft, is passed through the left and right crankshaft bearing holes 25L, 25R of the case 20, and the proximal ends of a pair of crank arms 13 are fitted to the left and right ends of the crankshaft 12 projected out from the case 20 respectively. Pedals 13a are rotatably attached at the ends of the crank arms 13 as shown in FIGS. 1 and 2.

As shown in FIG. 4, the bolt-shaped pivot shaft 8 extends through through-holes 2c of pivot bosses 2b formed at rear portions 2a of the mainframes 2 and bushes 14 fitted to the pivot shaft bearing holes 26L, 26R of the left and right reinforcing members 22L, 22R of the case 20, and is fixed to the rear portions 2a of the mainframes 2 by nuts N screwed onto the distal ends of the bolt-shaped pivot shaft 8, so that respective swing arms 9 are swingably supported by the pivot shaft 8 between the case 20 and the rear portions of the respective mainframes 2 and at the left and right outsides of the case 20 via collars 8a and bearings 8b.

FIG. 6 is a right side view of the interior of the transmission T with part of the right case 20R removed, showing the portion relating to the crankshaft 12 and the output shaft 15.

As is understood also from FIGS. 3 and 5, the rear wheel drive sprocket 16 is fitted to the right end of the output shaft 15 stored in the case 20 and projecting outward from an output shaft bearing hole 27 of the right case 20R.

As shown in FIG. 1, the rear wheel drive chain 18 is wound between the rear wheel drive sprocket 16 and the rear wheel driven sprocket 17 provided on the rear wheel Wr.

Here, the rear wheel drive sprocket 16, the rear wheel driven sprocket 17, and the rear wheel drive chain 18 constitute the drive force transmission mechanism for driving the rear wheel Wr, which is the drive wheel of the bicycle. The output shaft 15 is constantly coupled to the rear wheel Wr, and rotates in conjunction therewith in the forward direction P and the rearward direction Q (see FIG. 1).

As is seen in FIGS. 5 and 6, the transmission T includes a speed-change mechanism M1 and a gearshift mechanism M2 to be accommodated in the case 20.

Figure 10A:
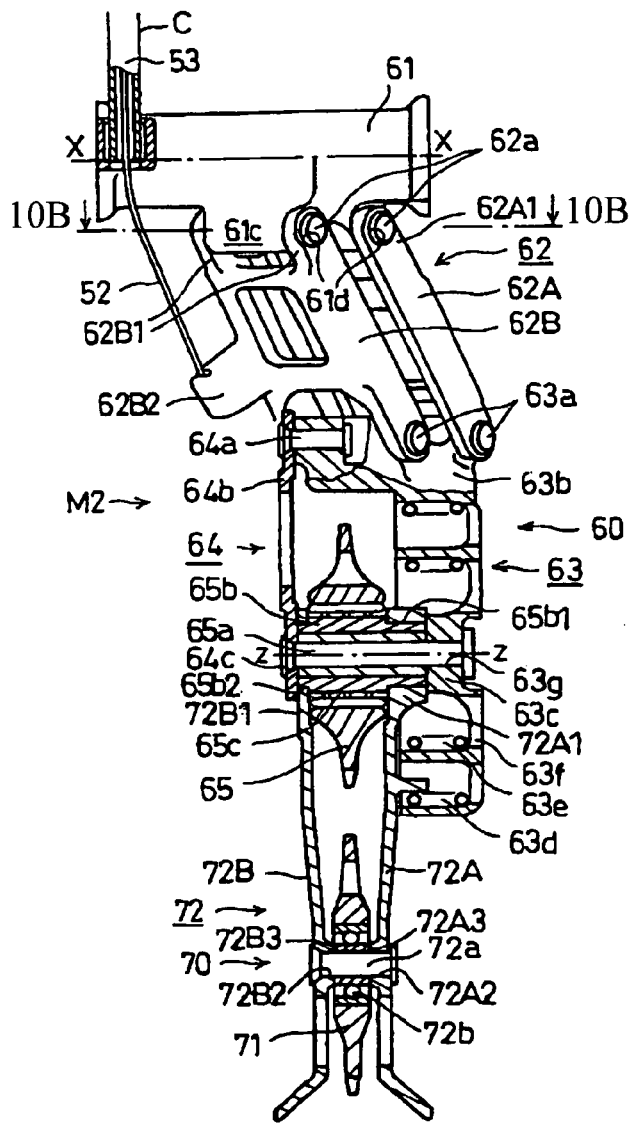
Figure 10B:
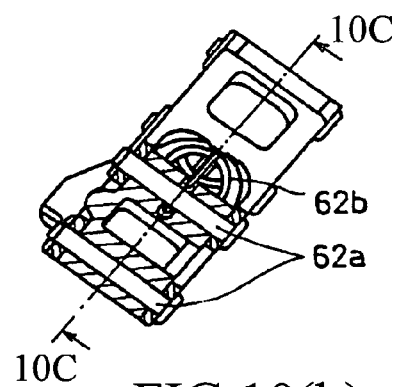

The speed-change mechanism M1 is, as shown in FIGS. 3, 5, 6 and so on, composed mainly of parts relating to the crankshaft 12 and the output shaft 15, and the gear shift mechanism M2 is composed mainly of parts relating to the derailleur shaft shown in FIG. 10, 11, 12 and so on.

The gearshift mechanism M2 acts on the speed-change mechanism M1, and shifts the speed-change mechanism M1 toward the desired shift position.

The gear-change mechanism M1 is provided with a one-way clutch 32 shown in FIGS. 3, 5, 6 and so on, and a sliding mechanism S, a drive sprocket unit 30, a speed-change sprocket unit 40, an endless speed-change chain 48, and the output shaft 15 shown in the same drawings.

The speed-change sprocket unit 40 includes a plurality of sprockets 41-47 overlapped into multi-stage in ascending order in size from the left to the right with spaces in-between and joined to the output shaft 15 by spline fitting.

As shown in FIGS. 3, 5 and so on, the crankshaft 12 is rotatably supported by the case 20 via a pair of left and right bearings 38 fitted to the crankshaft holes 25L, 25R of the left and right reinforcing members 22L, 22R of the case 20, and the crank arms 13 are integrally fitted to both ends of the crankshaft 12. As shown in FIG. 1, the pedals 13a are rotatably fitted to the distal ends of the crank arms 13, so that the crankshaft 12 is rotated in the forward direction P by the feet of a person who rides on the bicycle B, not shown, straddling over and sitting on the saddle 7.

In FIGS. 3, 5 and so on, the crankshaft 12 is provided with the drive sprocket unit 30 between the both bearings 38, and a drive sprocket 31 of the drive sprocket unit 30 is fitted to the crankshaft 12 via the one-way clutch 32 and the sliding mechanism S disposed coaxially with the crankshaft 12 and is rotated by the crankshaft 12.

Figure 7:
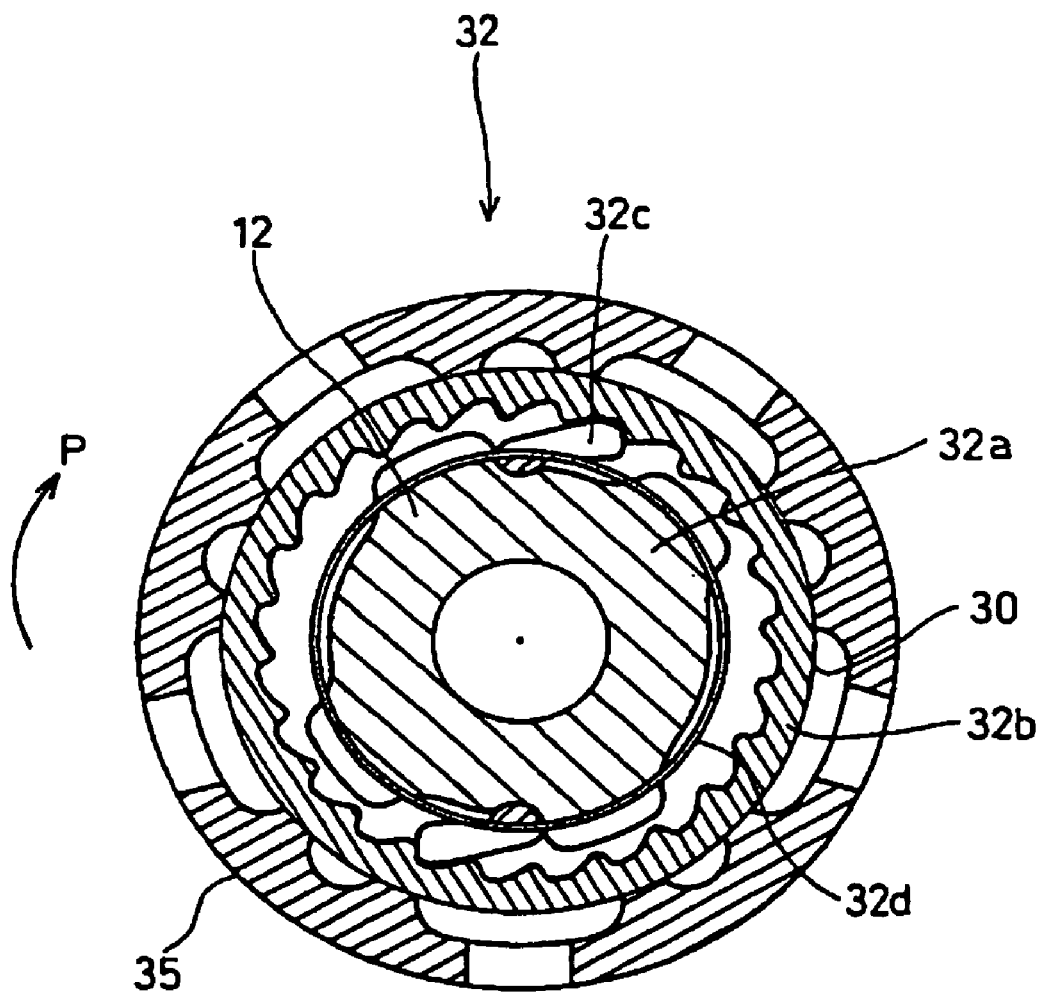
FIG. 7 is a cross-sectional view of a principal structure of a mounting portion of a crankshaft.

As shown in FIG. 7, the one-way clutch 32 includes a clutch inner 32a constituted of the outer periphery itself of part of the crankshaft 12, a clutch outer 32b constituted of part of an inner cylinder 34 (see FIG. 3 and so on) described later, a plurality of ratchet claws 32c that engage engaging portions on the inner periphery of the clutch outer 32b, and a ring spring 32d fitted to the clutch inner 32a for urging the distal end of the ratchet claw 32c to engage the recess on the inner peripheral surface of the clutch outer 32b.

By the action of the one-way clutch 32, a rotational force of the crankshaft 12 is transmitted to the drive sprocket 31 only when the person who rides on the bicycle B pushes the pedals 13a, and rotates the crankshaft 12 in the forward direction P, in which the bicycle B advances. When the person who rides on the bicycle B stops pushing the pedals 13a while the bicycle B is moving forward, and the drive sprocket 31 rotates in the forward direction P, that is, when the crankshaft 12 is rotated in the rearward direction Q with respect to the drive sprocket 31, transmission of the rotational force from the drive sprocket 31 to the crankshaft 12 is blocked.

In FIGS. 3, 4, 5 and so on, provided between the one-way clutch 32 and the drive sprocket 31 is the sliding mechanism S for allowing the drive sprocket 31 to move with respect to the crankshaft 12 in the direction of the axis of the crankshaft and rotating integrally with the clutch outer 32b of the one-way clutch 32.

The sliding mechanism S shown in FIGS. 3, 4, 5 and so on, includes the inner cylinder 34, an outer cylinder 35, and a ball spline mechanism 36. The inner cylinder 34 constitutes, at the right end thereof, the outer 32b of the one-way clutch 32, and is a cylinder rotatably supported on the outer periphery of the crankshaft 12 via a pair of needle bearings 33. The outer cylinder 35 is a cylinder disposed radially outwardly of the inner cylinder 34.

The ball spline mechanism 36 is a spline engaging mechanism using a ball 36c provided between the outer peripheral surface of the inner cylinder 34 and the inner peripheral surface of the outer cylinder 35. The drive sprocket 31 is integrally joined to an annular flange of the outer cylinder 35 of the corresponding mechanism by a rivet 31a. The outer cylinder 35 and the drive sprocket 31 are adapted to be capable of moving integrally along the direction of the axis of the crankshaft 12, and to rotate with respect to the case 20. A chain guide 37 is integrally mounted on the outer periphery of the drive sprocket 31 by a rivet 31b.

As shown in FIGS. 3, 4, 5 and so on, the ball spline mechanism 36 for allowing the sliding mechanism S and the drive sprocket 31 to rotate integrally with each other, and allowing the drive sprocket 31 and the outer cylinder 35 to move with respect to the inner cylinder 34 in the direction of the axis of the crankshaft is constituted of a plurality of pairs of accommodating grooves 36a, 36b of semi-circular in cross section radially opposing to each other on the outer peripheral surface of the inner cylinder 34 and the inner peripheral surface of the outer cylinder 35 and being oriented in the direction of the crankshaft, and a ball train including a plurality of balls 36c accommodated therein so as to rotate across the respective pair of accommodating grooves and circumferentially engage the inner cylinder 34 and the outer cylinder 35.

In order to define the movable range of the drive sprocket 31 and the outer cylinder 35, and to prevent the balls 36c from being dropped, stoppers 34a, 34b, 35a, 35b are provided at both ends of the inner cylinder 34 and the outer cylinder 35.

As shown in FIGS. 3 and 5, the output shaft 15 is rotatably supported via a pair of the left and right bearings 38 held respectively by the left and right reinforcing members 22L, 22R of the case 20.

The multi-stage speed-change sprocket unit 40 for speed change including a plurality of speed-change sprockets is mounted to the output shaft 15 between the left and right bearings 38 of the output shaft 15 so as to rotate constantly integrally with the output shaft 15. In this embodiment, the multi-stage speed-change sprocket unit 40 is a sprocket unit including seven types of speed-change sprockets 41-47 for speed change having different outer diameters.

The seven speed-change sprockets 41-47 are disposed in line in the direction of the axis of the output shaft in descending order in speed from the right to the left from the speed-change sprocket 47 for the seventh speed (maximum speed) having the smallest outer diameter to the speed-change sprocket 41 for the first speed (minimum speed) having the largest outer diameter, and are spline-fitted to the outer peripheral surface of the output shaft 15 and connected to the output shaft 15.

The speed-change chain 48 is wound around the drive sprocket unit 30 and the speed-change sprocket unit 40, and rotation is transmitted between the crankshaft 12 and the output shaft 15 by the speed-change chain 48. The gearshift mechanism M2 described later is a mechanism for changing the speed by shifting the speed-change chain 48 among a group of the speed-change sprockets 41-47. In other words, the gear shift mechanism M2 acts to wind the speed-change chain 48 between one of the speed-change sprockets selected from the speed-change sprockets 41-47 by the gear shift mechanism M2, and the drive sprocket 31.

Therefore, the output shaft 15 is rotated by the crankshaft 12 at a change gear ratio determined by the ratio of the number of teeth between the speed-change sprockets 41-47 and the drive sprocket 31.

Then, the motive power of the output shaft 15 is transmitted to the rear wheel Wr via the rear wheel drive sprocket 16, the rear wheel drive chain 18, and the rear wheel driven sprocket 17 (see FIG. 1) provided on the outside of the case 20 on the right side.

When the bicycle B in the related art travels by inertia, the speed-change chain 48 is not rotated. Therefore, it is difficult to shift the chain 48, and hence speed-change operation by the speed-change mechanism M1 cannot be performed normally. This embodiment has a structure improved at this point. The description of the structure will be added below.

Figure 8A:
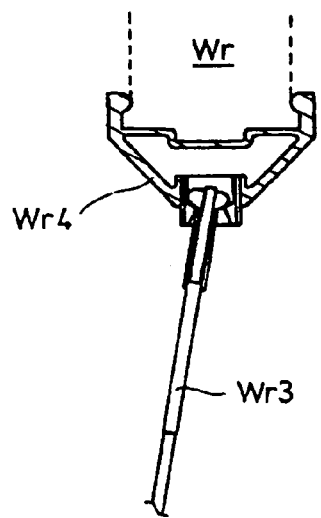
FIG. 8(a) is a drawing showing a structure of a rear wheel mounting portion
Figure 8C:
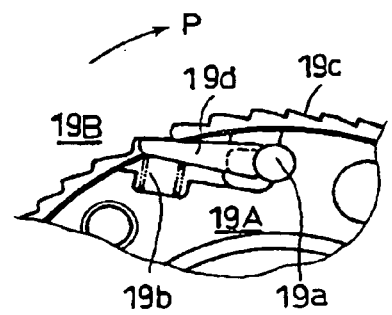
FIG. 8(c) is a cross-sectional view taken along the line 8C-8C in FIG. 8(b)
Figure 8B:
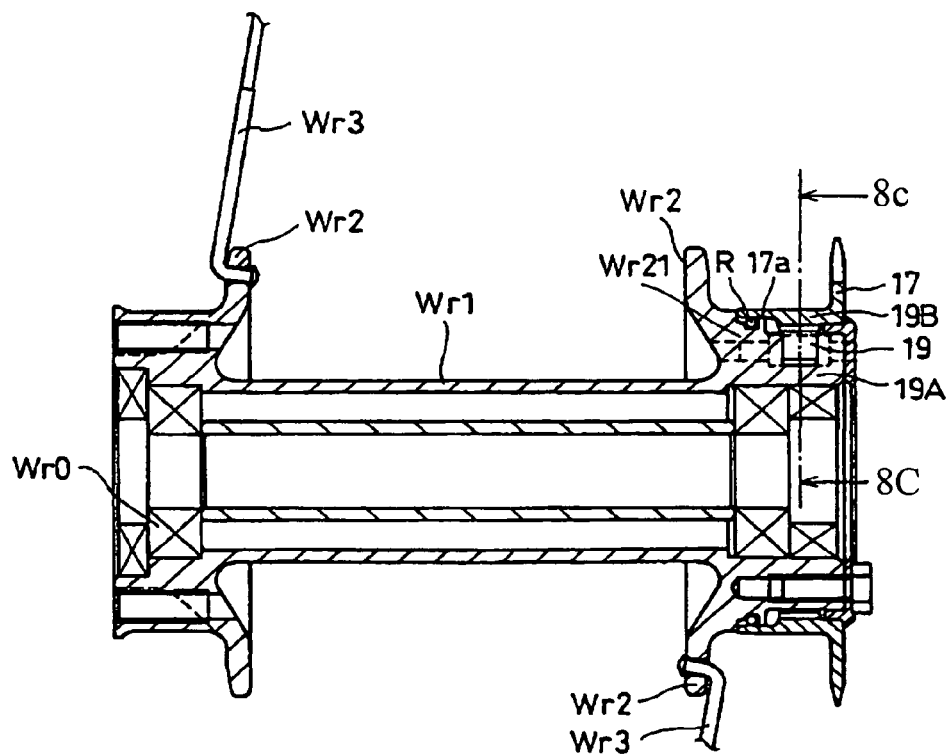
FIG. 8(b) is a cross-sectional view of the principal structure of the rear wheel mounting portion.

FIGS. 8(a)-8(c) show a structure of the mounting portion of the rear wheel Wr. A rear wheel hub Wr1 is rotatably supported by the rear axle which is fixedly supported by the swing arm 9, not shown in FIGS. 8(a)-8(c), via bearings Wr0. The hub Wr1 is provided with annular flanges Wr2 radially extending on both of the left and right sides thereof, and a number of spokes Wr3 for supporting the rear wheel Wr and extending in the radial direction are mounted to the annular flanges Wr2. The radial extremities of the spokes Wr3 are fixed to a wheel rim Wr4 of the rear wheel Wr, so that the rear wheel Wr is attached.

At the position on the right side of the right annular flange Wr2 of the hub Wr1 in the drawing, there is provided the driven sprocket 17, and the driven sprocket 17 is mounted to the hub Wr1 via the one-way clutch 19. The one-way clutch 19 has a structure as shown in FIG. 8(c).

In other words, the one-way clutch 19 includes a clutch inner 19A constituted of part of the outer periphery of the hub Wr1, a clutch outer 19B provided with a number of engaging portions 19c formed on the inner periphery of the driven sprocket 17, and a plurality of ratchet claw 19d having their rotational center 19a on the side of the clutch inner 19A and urged by a spring 19b so as to engage the engaging portions 19c on the inner periphery of the clutch outer 19B.

In the one-way clutch 19 in this structure, although the rotation P from the side of the clutch outer 19B, that is, the rotation from the side of the driven sprocket 17 is transmitted to the hub Wr1, and drive force is transmitted from the side of the driven sprocket 17 to the side of the hub Wr1, that is, to the side of the rear wheel Wr, the rotation on the side of the clutch inner 19A, that is, the rotation from the side of the hub Wr1 is not transmitted to the side of the sprocket 17.

In other words, it is configured in such a manner that the sprocket 17 is not driven by the drive chain 18 as in the case of inertia traveling with the rotation of the crankshaft 12 stopped, or that the side of the hub Wr1, that is, the side of the rear wheel Wr rotates freely when the rear wheel Wr is rotated relatively faster than the sprocket 17 as in the case of running the slope downward.

However, in this embodiment, a structure for limiting the above-described operation of the one-way clutch 19 is provided between the hub Wr1 and the driven sprocket 17, that is, an O-ring R that serves as a friction member, is interposed between an outer periphery Wr21 of the hub Wr1 closer to the right end of, and in the vicinity of, the annular flange Wr2 on the right side of the hub Wr1 and an inner periphery 17a closer to the left end of the driven sprocket 17, and both are fitted with friction to each other via the O-ring R. Therefore, when the rotation transmitting torque between them is within a predetermined range, both are retained to rotate integrally by friction and hence the one-way clutch 19 is in a state in which its function is substantially lost.

Therefore, in the inertia traveling of the bicycle B as well, the rotation on the side of the hub Wr1, that is, on the side of the rear wheel Wr is transmitted to the driven sprocket 17 as is, the rear wheel drive chain 18 is rotated in association with the rotation of the driven sprocket 17, the rotation of the rear wheel drive chain 18 is transmitted to the speed-change mechanism M1, and the speed-change chain 48 is rotated. With this structure, even during the above-described inertia traveling of the bicycle B, the chain 48 is shifted easily and hence the operation for changing the speed can be performed smoothly.

On the other hand, in order to prevent excessive load to the speed-change mechanism M1 during traveling of the bicycle B, the structure of this embodiment is adapted in such a manner that when a load exceeding a predetermined value is exerted to the rear wheel drive chain 18 from the side of the speed-change mechanism M1, the both rotates with respect to each other against the fitting frictional force of the O-ring R between the hub Wr1 and the sprocket 17, and hence only the rear wheel Wr rotates by the operation of the one-way clutch 19, whereby the rotation of the rear wheel Wr is not transmitted to the side of the driven sprocket 17 and the rear drive chain 18 and the speed-change chain 48 are not rotated, as a matter of course.

Subsequently, a structure relating mainly to a derailleur 60 of the gearshift mechanism M2 in this embodiment will be described.

Figure 9:
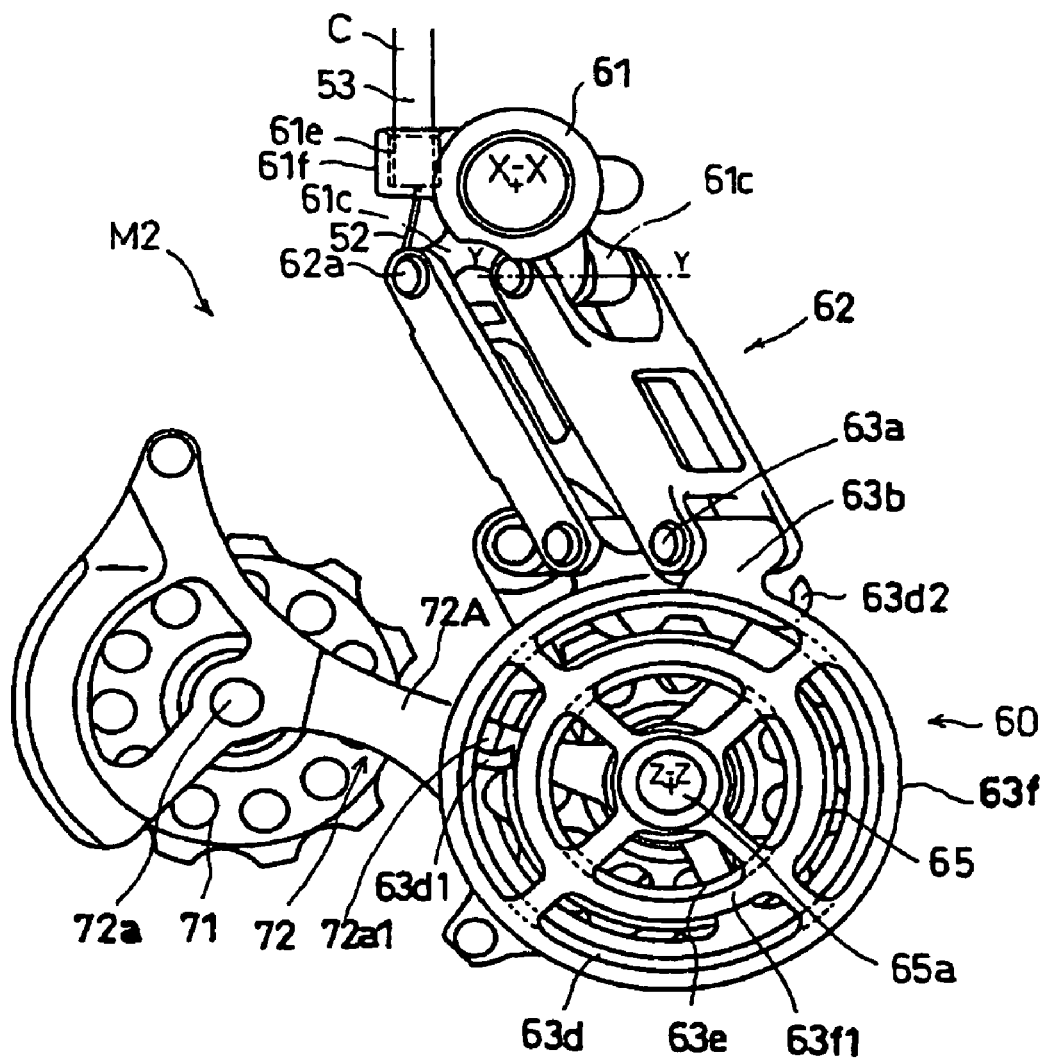
FIG. 9 is an outline perspective view showing an outline of an entire structure of a derailleur.

In FIG. 1 and FIG. 9, the gearshift mechanism M2 operated by a speed-change operation mechanism 50 at the handle of the bicycle B includes the derailleur 60 and a tensioner 70 having a tensioner pulley 71.

Then, as shown in FIG. 6, the speed-change chain 48 is wound around the drive sprocket 31 and the speed-change sprockets 41-47, and when traveling by manpower, around a guide pulley 65, which is disposed on the side where the speed-change chain 48 slacks, and the tensioner pulley 71.

The speed-change operation mechanism 50 shown in FIG. 1 includes a speed change operation member 51 formed of a speed-change lever or the like which is operated by the person riding on the bicycle B, and a speed-change cable C for connecting the speed-change operation member 51 and the derailleur 60 for transmitting the operation of the speed-change operation member 51 to the derailleur 60. The cable C includes an operating wire 52 and an outer cable 53 for covering the wire 52 (see FIG. 1 and FIG. 10), and the operating wire 52, which is the inner cable, substantially connects the speed-change operation member 51 and the derailleur 60.

Figure 11:
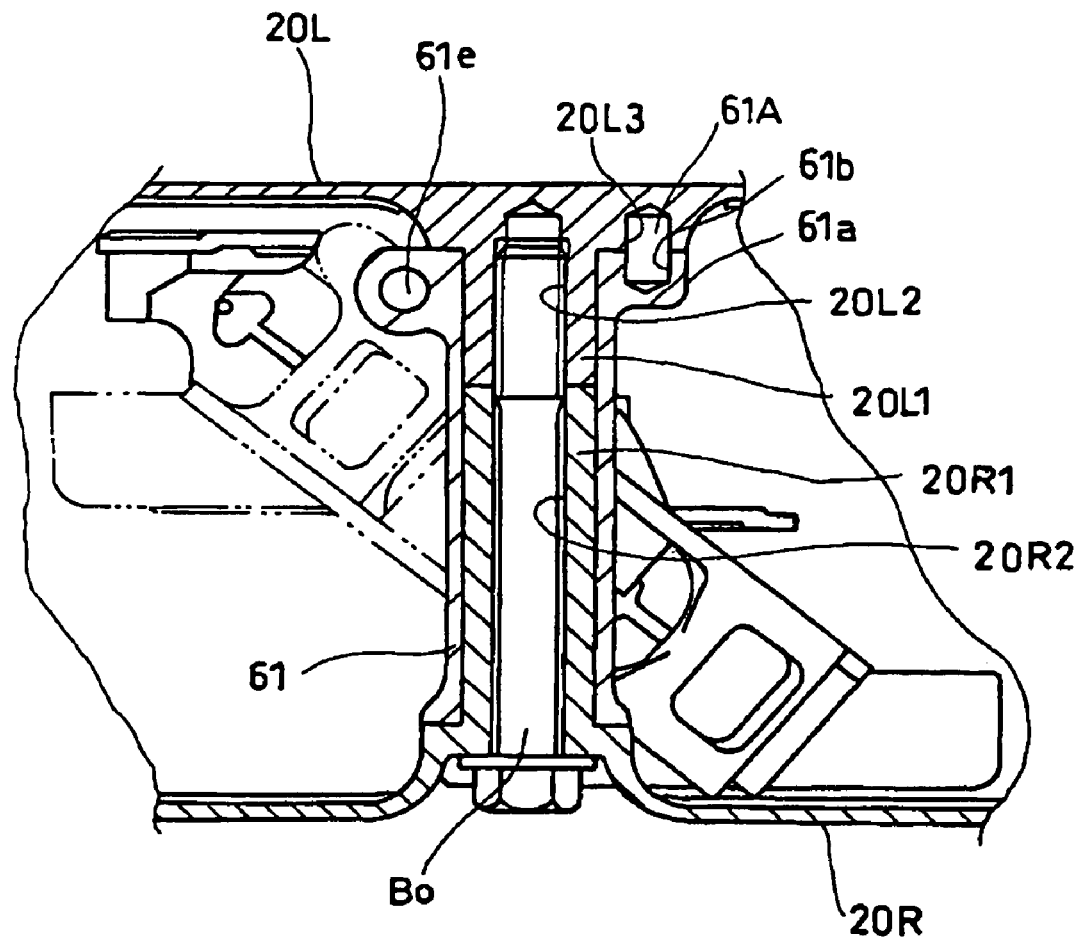
FIG. 11 is an enlarged cross-sectional view showing the structure of the mounting portion of a derailleur shaft and the mounting state thereof.
Figure 12A:
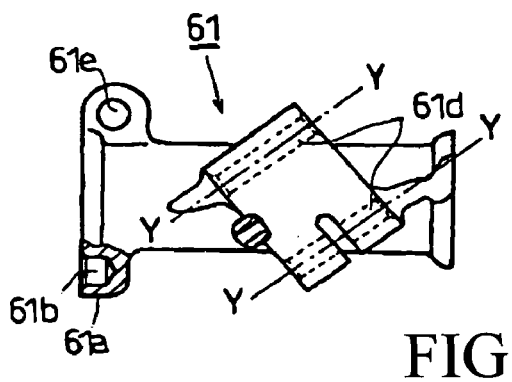
Figure 12B:
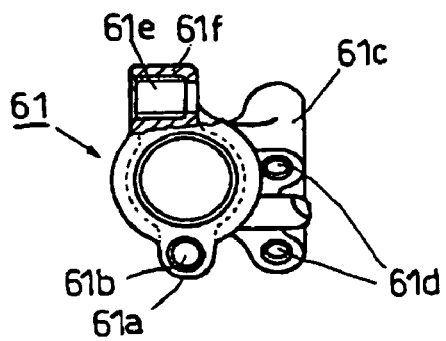
Figure 12C:
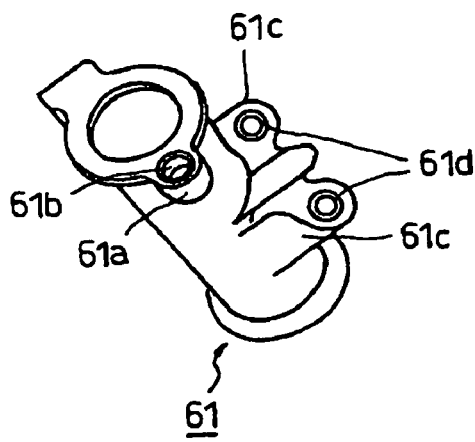
Figure 13A:
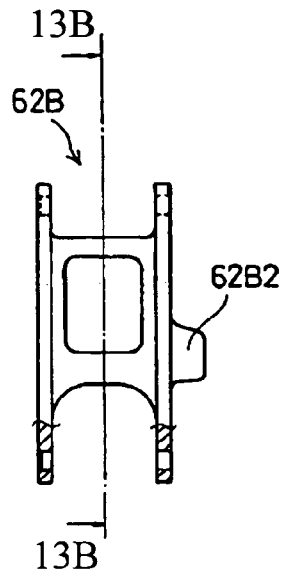
Figure 13B:
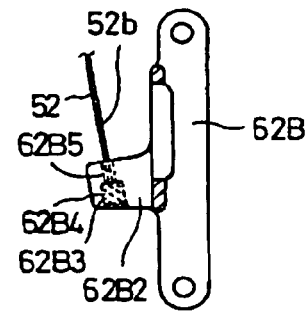
Figure 13C:
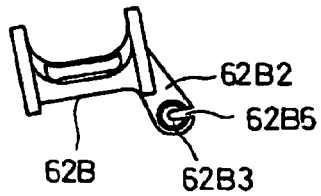
Figure 13D:
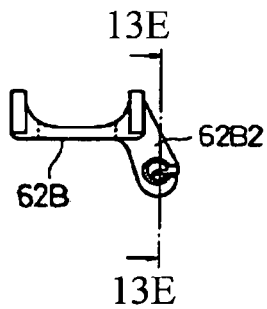
Figure 13E:
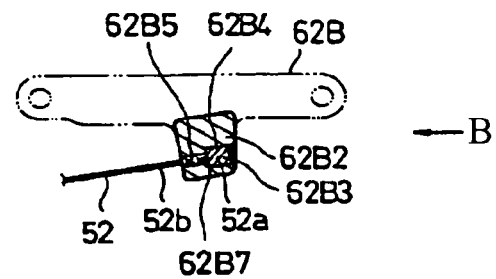

As shown in FIG. 11, the left and right cases 20L, 20R in pair are provided with bosses 20L1, 20R1 projecting inwardly at the upper position thereof. As will be understood from FIG. 11, the bosses 20L1, 20R1 are different in projecting length, since the widths of both cases 20L, 20R are different. The boss 20R1 on the side of the wider right case 20R has a longer projecting length and is provided with a through-hole 20R2, while the boss 20L1 on the side of the narrower left case 20L has a shorter projecting length and is provided with a blind hole 20L2. The blind hole 20L2 is formed with female thread.

When the left and right cases 20L, 20R are assembled and combined, both bosses 20L1, 20R1 oppose each other on an identical line. The projecting ends of both bosses 20L1, 20R1 abut against each other. A tightening bolt Bo inserted (fitted) into the through hole 20R2 of the boss 20R1 on the side of the right case 20R is screwed into the female screw of the blind hole 20L2 of the boss 20L1 on the side of the left case 20L, whereby both left and right cases 20L, 20R are strongly tightened and integrated with each other.

A derailleur shaft 61 in the shape of a hollow sleeve is fitted on the outer periphery of the bosses 20L1, 20R1 whereof the distal ends abut against each other. The sleeve-shaped derailleur 61 is provided with a hole 61b on the projecting portion 61a at the left shaft end. A stopper pin 61A is inserted between the hole 61b and a hole 20L3 that is formed on the proximal portion of the boss 20L1 of the left case 20L. Therefore, the derailleur shaft 61 is located at the right position with respect to the case 20L, and is fitted and supported with respect to the outer peripheries of both bosses 20L1, 20R1.

As shown in FIGS. 9 to 12, the derailleur 60 is mounted to the outer periphery of the sleeve-shaped derailleur shaft 61, and hence a protruding portion 61c of parallel construction having two parallel axis Y is provided on the outer periphery of the shaft 61. The protruding portion 61c is formed with holes 61d (see FIGS. 12(a)-12(d) and so on) to which supporting shafts 62a for mounting a derailleur arm unit 62 for mounting the derailleur 60 substantially to the derailleur shaft 61 are inserted. A pair of the holes 61d formed on the protruding portion 61c extend in parallel to each other, and the holes 61d have axes Y which extend in the direction intersecting the axis X of the sleeve-shaped derailleur shaft 61 at a predetermined angle.

The derailleur 60 includes the arm unit 62 having a pair of derailleur arms 62A, 62B formed of plates shaped like the letter H as shown in FIG. 9, 10, 13 and so on, and the arm unit 62 is rotatably supported by supporting shafts 63a in pair of a derailleur body 63 at the distal ends of the respective arms 62A, 62B, whereby two arms 62A, 62B are assembled into parallel linkage, and the derailleur 60 is mounted to the sleeve-shaped derailleur shaft 61 via the arm unit 62.

Mounting of the derailleur arm unit 62 in pair to the derailleur shaft 61 is achieved by locating bifurcated proximal portions 62A1, 62B1 of the respective derailleur arms 62A, 62B (see FIG. 10(a)) so as to sandwich the protruding portion 61c in pair of the derailleur shaft 61 from both sides thereof, and inserting the supporting shafts 62a into the holes 61d (see FIGS. 10, 12 and so on) of the protruding portion 61c. By this mounting, the derailleur arm unit 62 of parallel linkage is rotatably supported about the two supporting shafts 62a intersecting with the derailleur shafts 61 at a predetermined angle.

Figure 10C:
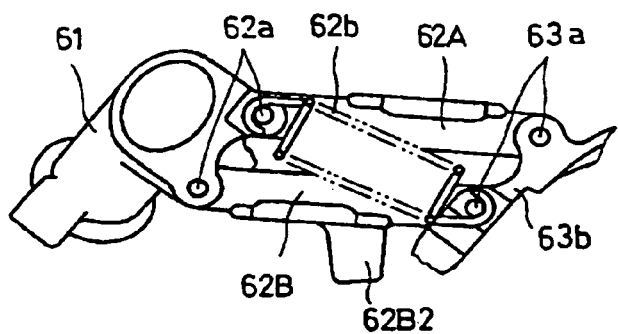

Then, a compression spring 62b is provided between the supporting shaft 62a of the proximal portion 62A1 of one of the derailleur arms 62A of the derailleur arm unit 62 of parallel linkage and the supporting shaft 63a of the derailleur body 63 at the distal end of the other derailleur arm 62B (see FIG. 10(c)).

When the operating wire 52, which is an inner cable of the speed-change cable C is in a slacked state, the compression spring 62b serves to pull a pair of the derailleur arms 62A, 62B toward each other, and when the speed-change wire 52 is in slacked state in which the speed-change operation is not done, the two derailleur arms 62A, 62B are maintained in a state shown in FIG. 10(c). In this meaning, this state is positioned as an initial state of the derailleur arms 62A, 62B, and when the derailleur arm unit 62 is in this state, a state in which the speed-change chain 48 of the speed-change mechanism M1 shown in FIG. 3, 5 and so on is wound around the sprocket 47 for the maximum speed is maintained.

The operating wire 52, which is the inner cable of the speed-change cable C, is mounted at one end to an outward projection 62B2 at the side end of the one of the arms 62B of the derailleur arm unit 62 as shown in FIGS. 9, 13 and so on, and therefore, the outward projection 62B2 is provided with a mounting hole 62B3 for the operating wire 52.

Mounting of the operating wire 52 to the outward projection 62B2 at the side end of the arm 62B is achieved by inserting and fixing one end of the wire 52 to the mounting hole 62B3 provided on the projecting portion 62B2, and the hole 62B3 is a through-hole having a large-diameter portion 62B4 and a small-diameter portion 62B5, whereby a slit-shaped cutting groove 62B6 is provided on the side of the hole 62B3.

On the other hand, there is provided a protruded portion 52a having a larger diameter than that of the wire 52 for fixing the wire 52 to the mounting hole 62B3 at one end of the operating wire 52. By inserting the wire 52 into the hole 62B3 from the side surface of the hole 62B3 along the slit-shaped cutting groove 62B6, and pulling a wire extension 52b extended from the small-diameter portion 62B5 of the hole 62B3 with a strong force, the protruded portion 52a is press-fitted to the large diameter portion 62B4 of the hole 62B3 and is abutted against, and engaged with, a shoulder portion 62B7 between the large-diameter portion 62B4 and the small-diameter portion 62B5 of the mounting hole 62B3. Consequently, the operating wire 52 is attached to the side end portion of the one of the arms 62B of the derailleur arm unit 62 whose one end is formed into a pair.

Then, by inserting the extending portion 52b of the operating wire 52 extended from the mounting hole 62B3 of the outward projection 62B2, which is the wire mounting portion on the side end portion of the arm 62B, into the outer cable 53 via a mounting hole 61e of the outer cable 53 of the operating cable C for the derailleur shaft 61, the speed-change cable C is extended from the through hole 20L1 opened toward the upper front of the left case 20L of the transmission case 20 toward the speed-change operation mechanism 50 on the handle as shown in FIGS. 1 and 2, the extended end, which is the other end of the cable C, is attached to the speed-change operation mechanism 50, and the operating wire 52, which is the inner cable of the cable C, is attached to the speed-change operating member 51 of the mechanism 50 via means, not shown.

Extension of the speed-change cable C toward the speed-change operation mechanism 50 is substantially linear state from the mounting hole 62B3 along the front of the vehicle body as shown in FIGS. 1 and 2, so that reduction of the length of the speed-change cable C is achieved, whereby smooth movement of the operating wire 52, which is the inner cable of the cable C, within the cable C is ensured, and reduction of speed-change operating load is also achieved.

Then, when the operating wire 52 of the cable C is pulled during the speed-change operation, the arm portion 62 including a pair of the derailleur arms 62A, 62B of parallel linkage, is rotated about the two supporting shafts 62a as the centers of rotation while being deformed to rise against the compression force of the compression spring 62b, and the derailleur arm unit 62 of parallel linkage is rotated about the two supporting shafts 62a as the centers of rotation while being deformed to be collapsed by the compression force of the compression spring 62b by loosening the operating wire 52 of the speed-change cable C by the speed-change operation, so that the derailleur arm unit 62 is returned to the initial state shown in FIG. 10(c).

As shown in FIGS. 9 and 10, a proximal end 63b of the derailleur body 63 is rotatably mounted to the distal ends of the derailleur arm unit 62 of parallel linkage, via a pair of the supporting shafts 63a, the derailleur body 63 has a shape of substantially flat cylindrical member which is deviated toward one side. A spring holder unit 63f in which a large-diameter torsion coil spring 63d and a small-diameter torsion coil spring 63e disposed coaxially so as to surround a center boss 63c and wound in the same direction are stored is provided inside the derailleur body 63.

Then, a proximal end 64b of the arm member 64 is rotatably supported by a supporting pin 64a and extended at the position adjacent to the proximal end 63b of the derailleur body 63, that is, at the position adjacent to the mounting position of the derailleur body 63 with respect to the distal end of the derailleur arm unit 62 so as to oppose to the spring holder unit 63f, and the guide pulley 65, described above, is rotatably journaled by a supporting shaft 65a in a space between the arm member 64 and the spring holder unit 63f of the derailleur body 63.

Journaling of the guide pulley 65 in the space by the rotatable supporting shaft 65a is achieved by the supporting shaft 65a inserted into through-holes 63g, 64c (see FIGS. 10(a)) formed on the opposing surfaces of the derailleur body 63 and the arm member 64, respectively, and the guide pulley 65 is supported by a bearing 65c via a sleeve 65b fitted to the supporting shaft 65a.

Figure 14A:
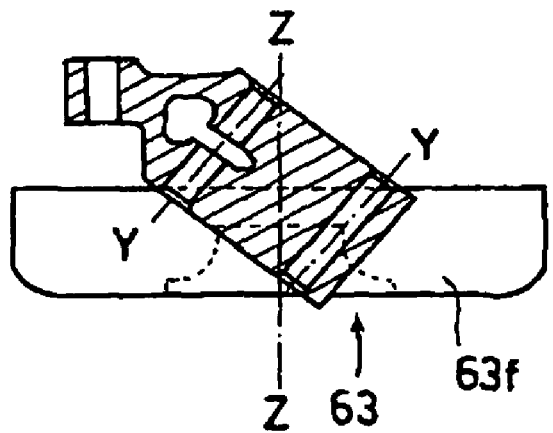
Figure 14B:
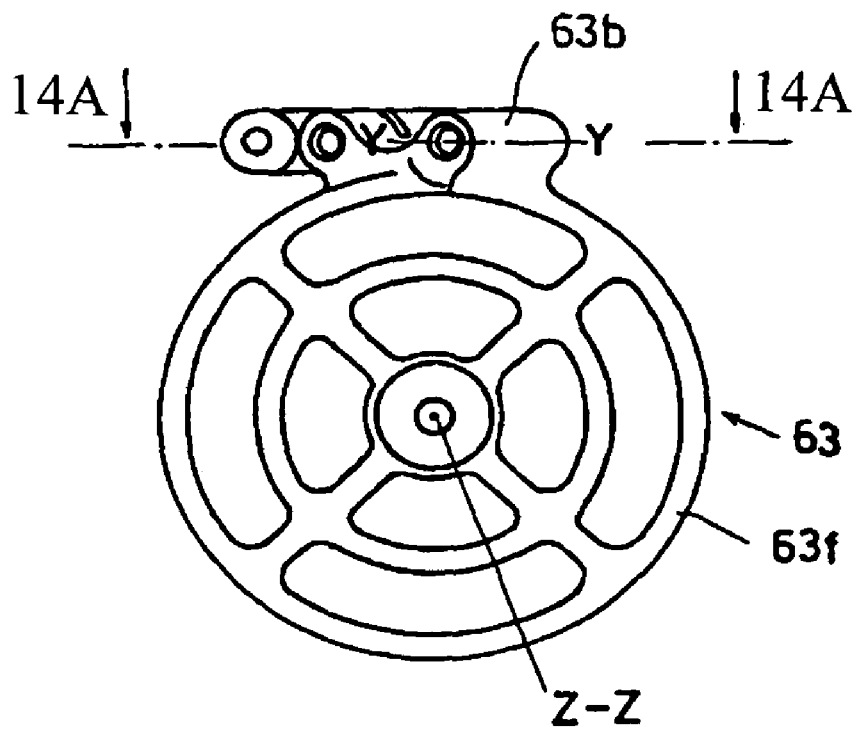

As is understood characteristically from FIGS. 9, 10, 14 and so on, the supporting shaft 65a is provided in such a manner that the axis Z thereof extends in parallel with the axis X of the derailleur shaft 61 (see FIGS. 9 and 10), and this structure ensures maintenance of an adequate state of the speed-change chain 48 wound around the guide pulley 65.

Although rotatable journaling of the guide pulley 65 by the supporting shaft 65a is supported by the bearing 65c via the sleeve 65b as described above, as shown in FIG. 10, the sleeve 65b is formed with annular shoulders 65b1, 65b2 at both ends of the outer periphery thereof, and proximal portions 71A1, 72B1 of a tensioner arm unit 72 including a pair of plate-shaped arms 72A, 72B are swingably supported on the shoulders in pair, respectively.

The tensioner arm unit 72 including a pair of the tensioner arms 72A, 72B extending from the proximal portions 72A1, 72B1 by a predetermined length with the plate surfaces opposing to each other, and the arms are formed respectively with bosses 72A3, 72B3 having through-holes 72A2, 72B2 on the opposite surfaces thereof in the vicinity of the distal ends.

The position in the vicinity of the distal end of the tensioner arms 72A, 72B, a tensioner pulley 71 is rotatably supported between the bosses 72A3, 72B3 via a bearing 72b by a supporting shaft 72a inserted into the through holes 72A2, 72B2 of the bosses 72A3, 72B3.

Then, the distal end of the tensioner arm unit 72 is configured in such a manner that the both tensioner arms 72A, 72B are integrally fixed to each other by the supporting shaft 72a.

As shown in FIG. 9, a projection strip 72a1 projecting from the surface of the arm 72A, which is one of a pair of the tensioner arms of the tensioner arm unit 72 located closer to the spring holder unit 63f of the derailleur body 63, opposing to the holder toward the holder unit 63f is provided, and the projecting end of the projecting strip 72a1 reaches the interior of the holder unit 63f.

Then, one end 63d1 of the outer spring 63d out of the two torsion coil springs 63d, 63e accommodated in the spring holder unit 63f is engaged with the projected end of the projecting strip 72a1, the other end 63d2 of the spring 63d is engaged with the slot penetrated from the inner peripheral surface to the outer peripheral surface of the holder 63f, and the spring 63d provides a rotational force in the clockwise direction in FIG. 6 to the tensioner arm unit 72.

The inner spring 63e is a torsion coil spring which is wound in the same direction as the outer spring 63d and, one end thereof is engaged with the tensioner arm 72A at the side of the arm in the vicinity of the proximal portion thereof, although not shown clearly, and the other end is engaged with the slot formed on an intermediate annular rib 63f1 (see FIG. 9) of the holder 63f. The spring 63e provides a rotational force in the clockwise direction, which is the same direction as the outer spring 63d, to the tensioner arm unit 72, and these two springs 63d, 63e cooperate and provide a reaction force against a counterclockwise swinging movement of the tensioner arm unit 72 by the resilient force of these springs.

Then, the tensioner arm unit 72 is adapted, by means of the tensioner pulley 71 rotatably journaled by the supporting shaft 72a at the distal end thereof, to provide an adequate tension generated by the resilient force of the torsion coil springs 63d, 63e to the speed-change chain 48 wound around the pulley 71, that is, the speed-change chain 48 having a winding structure such as being wound on the drive sprocket 31 journaled by the crankshaft 12 via the one-way clutch 42 and the sliding mechanism S clockwise in FIG. 6, wound on the tensioner pulley 71 clockwise, passed between the pivot shaft 8 and the guide pulley 65 and wound on the guide pulley 65 counterclockwise, and subsequently wound on the sprocket of the speed-change sprocket unit 40.

The derailleur 60 has the above-described mounting structure, and the derailleur 60 having the derailleur arm unit 62 of parallel linkage supported by the derailleur shaft 61 via the supporting shaft 62a of the protruding portion 61c receives an operating force generated by pulling and slackening of the operating wire 52, which is an inner cable of the speed-change cable C, according to the speed-change operation of the speed-change operating member 51, and the derailleur arm unit 62 of parallel linkage is rotated by a compression force of the compression spring 62b or against the compression force, thereby generating swinging motion for shifting the speed-change chain 48 among the multi-stage speed change sprockets 41-47.

The rotation of the derailleur arm unit 62 of parallel linkage is done about the two parallel supporting shafts 62a having the axes Y which intersect the derailleur shaft 61 at a predetermined angle as the centers of rotation. When the arm unit 62 is rotated, the derailleur body 63 at the distal end of the arm unit 62 rotates with respect to the arm unit 62 about the supporting shaft 63a while maintaining the position shown by an imaginary line in FIG. 1 and keeping the rotational angle of itself about the fulcrum 63a irrespective of the rotational movement of the arm unit 62. Accordingly, the variation in rotation of the guide pulley 65 in association with the rotation and swinging movement of the derailleur arm unit 62 occurring at speed-change operation, and irregular variations in rotation of the speed-change chain 48 wound around the guide pulley 65 are prevented.

By the above-described rotation of the derailleur arm unit 62 about the supporting shaft 62a, the guide pulley 65 attached to the derailleur body 63 via the supporting shaft 65a is moved, as shown in FIGS. 3, 4, 5, 6 and so on, for example, from the speed-change sprocket 47 having the smallest outer diameter to the speed-change sprocket 41 having the largest outer diameter in the multi-stage speed-change sprocket unit 40, or from the speed-change sprocket 41 having the largest outer diameter to the speed-change sprocket 47 having the smallest outer diameter (see the position indicated by a solid line and the position indicated by an imaginary line), so that the speed-change chain 48 is shifted to a desired speed-change sprocket in the multi-stage speed change by the speed-change mechanism M1 described later by the movement of the guide pulley 65.

The range of movement of the guide pulley 65 in association with the rotation of the derailleur arm unit 62 of parallel linkage is the range from a first position, indicated by the solid line, closest to the output shaft 15 in FIG. 6, which corresponding to the initial state of the derailleur arm unit 62 because of the action of the compression spring 62b, to a second position, indicated by the imaginary line, farthest from the shaft 15. In this embodiment, speed change from the seventh speed, which is the highest speed, to the first speed, which is the lowest speed, is performed during the movement from the first position indicated by the solid line to the second position indicated by the imaginary line. In other words, the speed-change chain 48 is shifted from the sprocket 47 having the smallest outer diameter to the sprocket 41 having the largest outer diameter in the speed-change multi-stage sprocket unit 40.

In association with the movement of the guide pulley 65 for shifting the speed-change chain 48 to the respective stages of speed-change sprockets, the tensioner 70 is subjected to a pressing force due to the change of tension of the speed-change chain 48. Accordingly, the tensioner arm unit 72 rotates about the supporting shaft 65a of the guide pulley 65, and is moved from the first position, which is the initial position indicated by the solid line in FIG. 6 to the second position indicated by the imaginary line.

Then, the tensioner arm unit 72 can always provide an adequate magnitude of tension to the speed-change chain 48 by the action of the torsion coil springs 63d, 63e accommodated in the spring holder unit 63f at the first position indicated by the solid line, at the second position indicated by the imaginary line, and the intermediate position between thereof, whereby slaking of the speed-change chain 48 is prevented.

The structure of the derailleur 60 in this embodiment, and the mounting structure are as described above.

Reference numeral 80 in FIG. 6 is an alignment mechanism of the speed-change chain 48. Therefore, a brief description of the alignment mechanism 80 of the speed-change chain 48 will be added.

In FIG. 6, a chain guide member 81 for aligning the speed-change chain 48 is provided in a path of the speed-change chain 48 wound between the delivering side of the chain 48 of the speed-change sprocket unit 40 and the retracting side of the chain 48 of the above-described drive sprocket 31.

Figure 15:
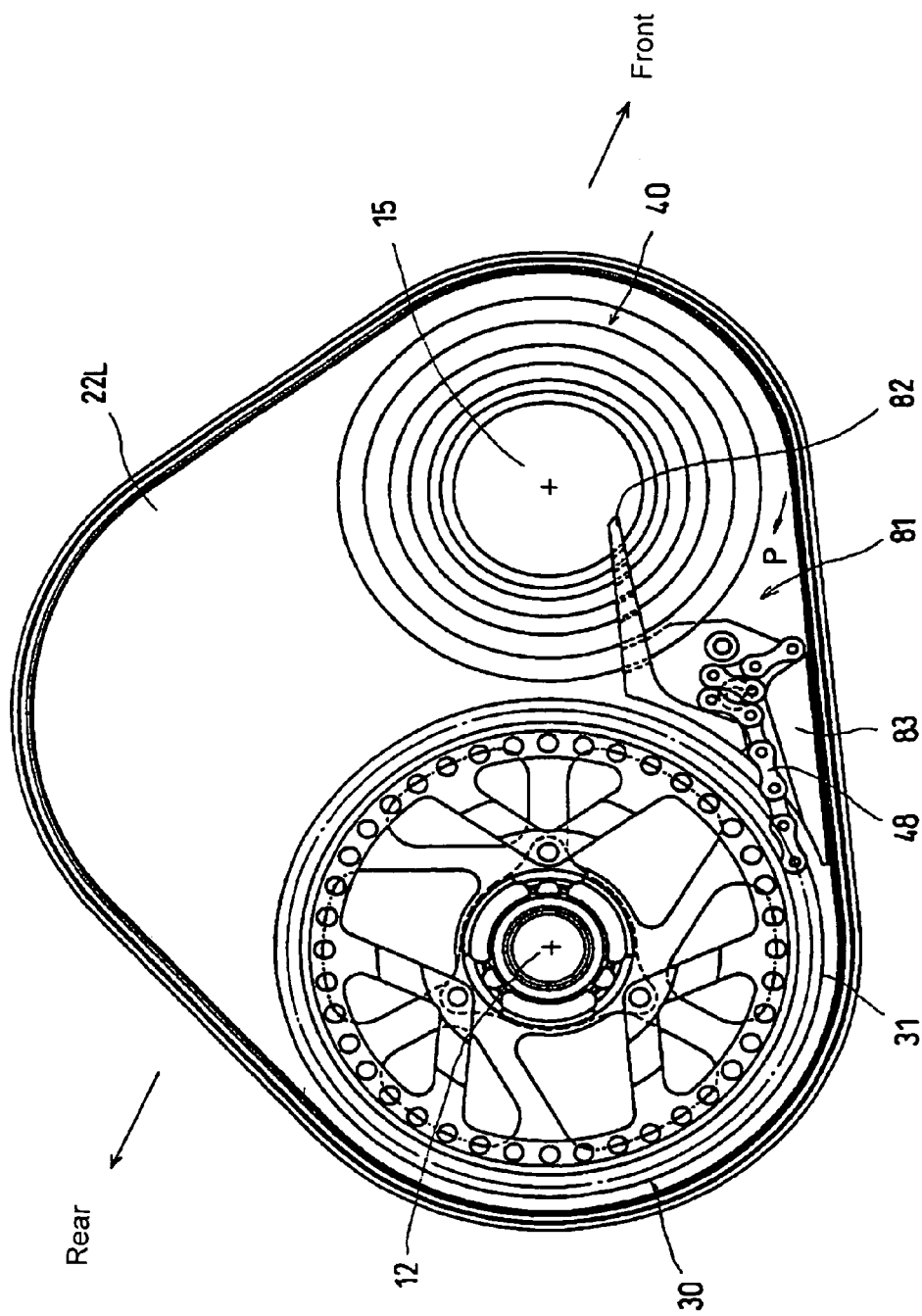
FIG. 15 is a drawing showing the structural portion relating to the alignment of speed-change chains in a transmission case.
Figure 16A:
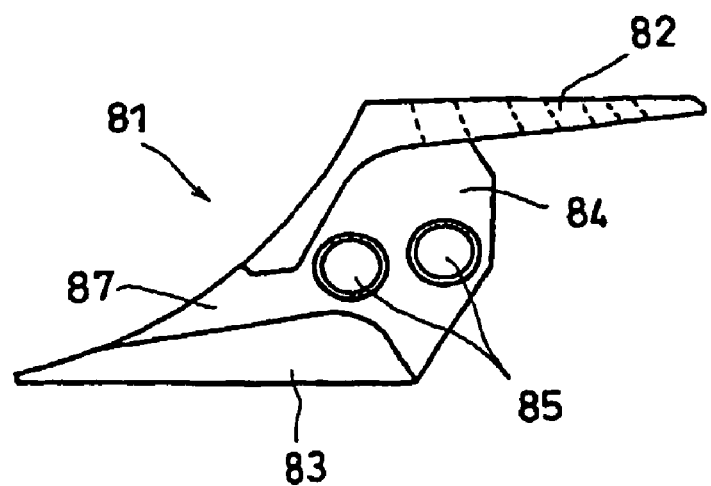
Figure 16B:
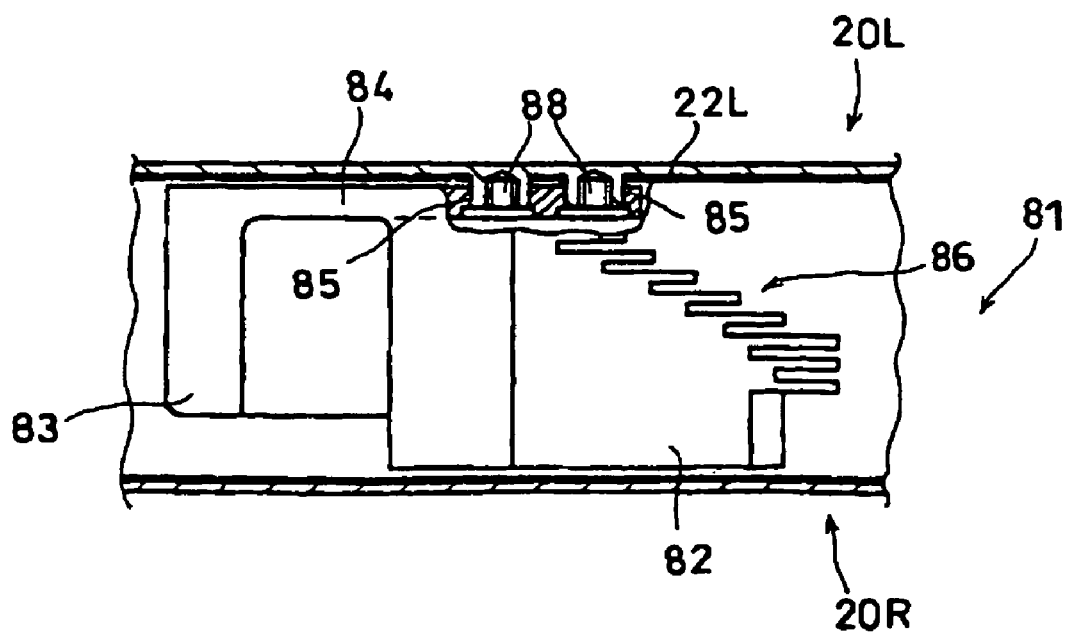

FIG. 15 is a right side view showing only the members relating to the alignment of the speed-change chain 48 in the case 20 for showing the respective positional relation among the above-described speed-change sprocket unit 40, the drive sprocket 31, and the chain guide member 81. FIG. 16(a) is a side view of the above-described chain guide member 81, and FIG. 16(b) is an upper view of the chain guide member 81. The above-described chain guide member 81 is formed of synthetic resin, and an upper guide member 82 disposed on the upper side of the chain path, a lower guide member 83 disposed on the lower side of the chain path, and an interconnecting member 84 for connecting the above-described guide members.

The upper guide member 82 is an upper movement limiting member of the speed-change chain 48, and the lower guide member 83 is a lower movement limiting member of the speed-change chain 48, and the above-described members are integrated by the interconnecting member 84 into one part. The interconnecting member 84 is formed with two bolt holes 85, and as shown in FIG. 16(b), the chain guide member 81 is fixed to the left reinforcing member 22L of the case 20L via a bolt 88 to be inserted into the bolt hole 85.

The chain guide member 81 is, as shown in FIGS. 6, 15 and 16, disposed at the mid point between the speed-change sprocket unit 40 and the drive sprocket 31, and the above-described upper guide member 82 is provided at the position overlapped with the multi-stage sprocket unit 40 in side view.

The surfaces of the upper and lower guide members 82, 83 on the side of passage of the speed-change chain extends in parallel with each other when viewed in the direction of movement of the speed-change chain 48, and is formed so that the width sufficient for allowing the speed-change chain 48 to pass through between the upper and lower guide members 82, 83 is secured.

As shown in FIG. 16(b), the distal end on the side of the speed-change sprocket unit 40 on the upper guide member 82 is formed with an inclined comb-shaped portion 86. The respective comb teeth are inserted into the gaps of the serrated edges of the respective speed-change sprockets 41-47, and when shifting the speed-change chain 48, the speed-change chain 48 is reliably removed from any one of the speed-change sprockets 41-47 to which the speed-change chain 48 engages, and the speed-change chain 48 is delivered toward the drive sprocket 31.

As shown in FIG. 16(a), a throat portion 87 for limiting the position of the speed-change chain 48 passing therethrough in the vertical direction into a narrow space is provided on the side of the drive sprocket 31 of the chain guide member 81. This is a portion in which the vertical width of the passage of the speed-change chain 48 is reduced.

Subsequently, a tension adjusting mechanism for the rear wheel drive chain 18 provided in this embodiment will be described.

Figures 17A, 17B:
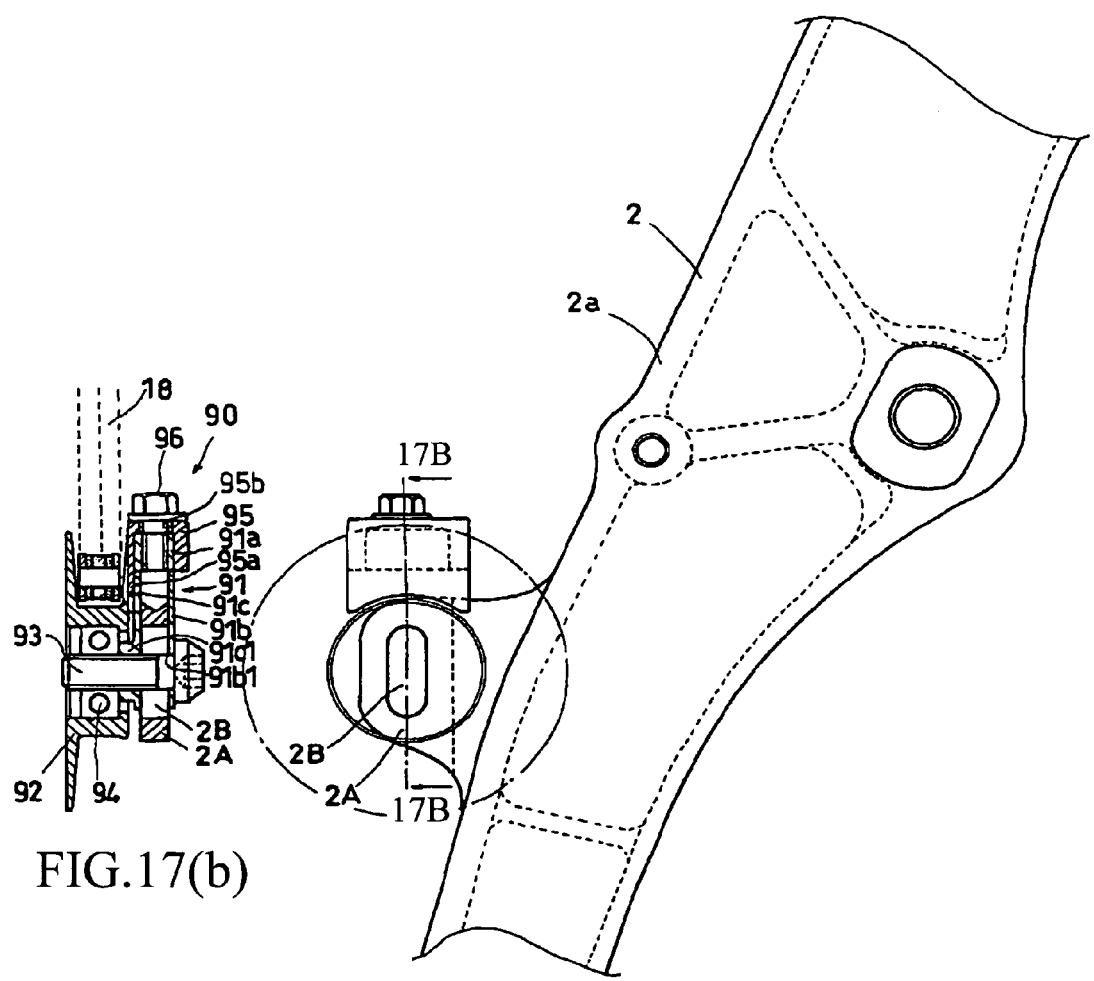

As shown in FIG. 17, a chain tension adjusting mechanism 90 for adjusting the extension of the rear wheel drive chain 18 is provided. The tension adjusting mechanism 90 of the chain 18 is provided on a projecting strip 2A formed so as to project rearward from a rear portion 2a of the mainframe 2 adjacent to the traveling path of the rear drive chain 18, and the projecting strip 2A is formed with an elongated hole 2B.

Then, a roller holding member 91 having a head portion 91a formed with a thread and a pair of plate-shaped clamping strips 91b, 91c extending from the head portion 91a is provided, and one 91b of a pair of the plate-shaped clamping strips 91b, 91c of the roller holding member 91 is formed with an opening 91b1 through which a tightening bolt 93 which serves substantially as a shaft for a supporting roller 92, and the other one 91c of them is formed with a boss 91c1 formed with a female screw for a tightening bolt 93.

The roller holding member 91 is clamped between a pair of the plate-shaped clamping strips 91b, 91c from both sides of the peripheral portion of the elongated hole 2B on the projecting strip 2A including the elongated hole 2B itself, and is held on the projecting strip 2A by inserting the tightening bolt 93 from the opening 91b1 of the one of the clamping strips 91b and screwing and tightening the bolt 93 passed through the elongated hole 2B into the screw hole of the boss 91c1 of the other clamping strip 91c.

A roller 92 is rotatably supported by the extended shaft portion of the tightening bolt 93 projected from the screw hole of the boss member 91c1 of the plate-shaped clamping strip 91c via a bearing 94, and the head portion 91a of the roller holding member 91 described above is provided with a holding member 95 having a groove-shaped structure formed by being bent into angular C-shape for clipping and covering the head portion 91a, and a leg 95a whose lateral ends are abutted against and fixed to the projecting strip 2A. The holding member 95 is formed with an unloaded hole 95b through which an adjust bolt 96 passes through on top thereof.

Therefore, in order to adjust the tension of the rear wheel drive chain 18, by loosening the tightening bolt 93 which serves as a shaft for substantially supporting the roller 92 and rotating the adjust bolt 96 inserted through the unloaded hole 95b of the holding member 95 and screwed into the screw hole of the head portion 91a of the roller holding member 91 in the lateral direction, the roller holding member 91 moves along the elongated hole 2B on the projecting strip 2A in the vertical direction, and the degree of abutment of the roller 92 with respect to the chain 18 is adjusted. When an adequate tension adjustment of the chain 18 is achieved, the tightening bolt 93 may be tightened again and the roller retaining member 91 may be fixed with respect to the projecting strip 2A.

Figure 18:
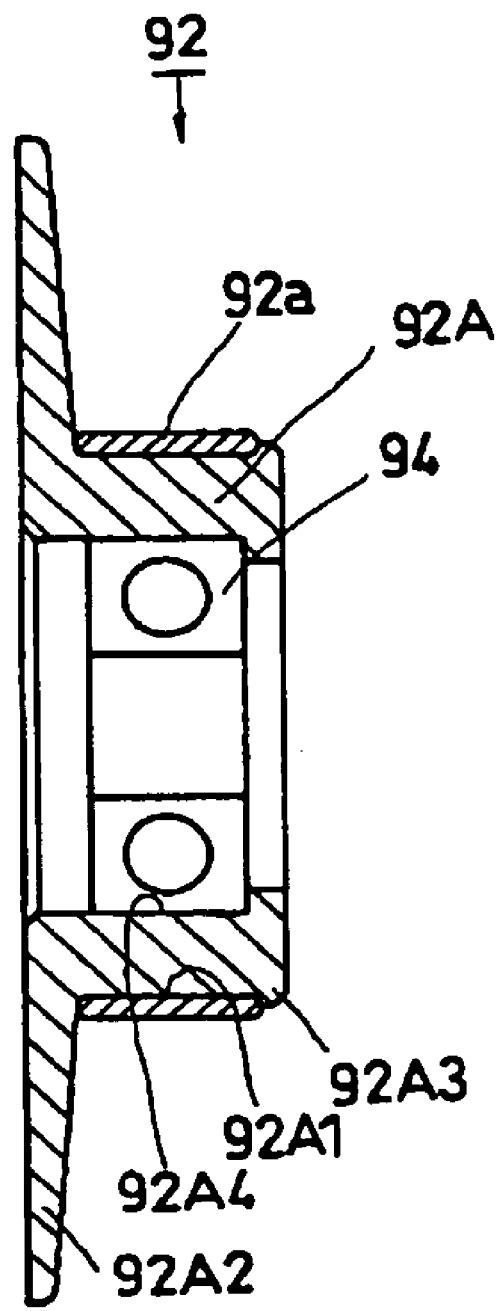
FIG. 18 is a cross-sectional view of a roller of the chain tension adjusting mechanism.
Figure 19A:
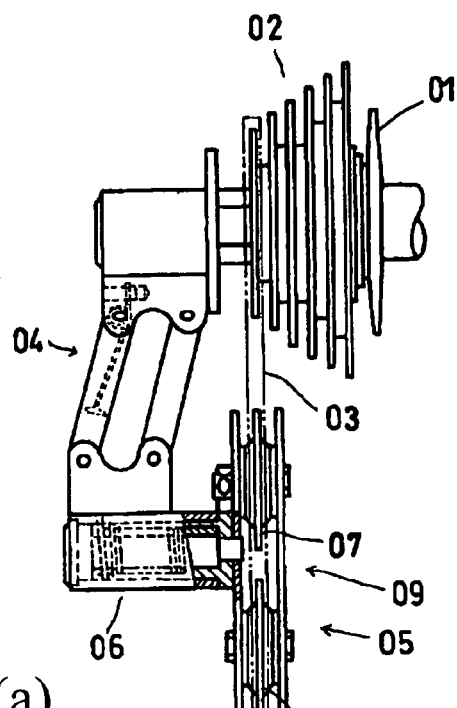
Figure 19B:
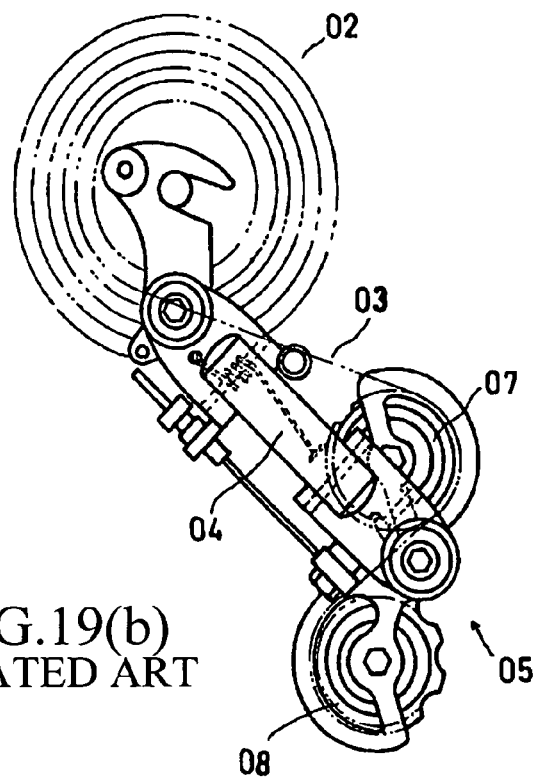

The roller 92 has a structure shown in FIG. 18.

In other words, the roller 92 is provided with an annular portion 92A1 to which the chain abuts on the outer periphery of a roller body 92A formed of metal such as aluminum alloy or hard resin, an annular flange 92A2 for preventing the chain from coming off provided at the left end of the annular portion 92A1 in the drawing, and an annular small projection 92A3 provided at the right end of the annular portion 92A1 in the drawing, and an annular chain abutting member 92a formed of hard rubber or the like is fitted and fixed to the annular portion 92A1 between the flange 92A2 and the small projection 92A3. On the inner periphery of the roller body 92A, a recess 92A4 is provided, and the bearing 94 is fitted in and fixed to the recess 92A4.

The operation of this embodiment configured as described above will now be described.

When the person riding on the bicycle B presses the pedal 13a, the crankshaft 12 is rotated in the normal direction P (see FIG. 1), and the rotation is transmitted from the crankshaft 12 to the drive sprocket 31, and then to the speed-change mechanism M1 through the speed-change chain 48. In the speed-change mechanism M1, a desired speed-change sprocket is selected by the speed-change operation of the person riding on the bicycle B. The rotation changed in speed via the sprocket is transmitted to the rear wheel Wr via the output shaft 15, the rear wheel drive sprocket 16, the rear wheel drive chain 18, and the rear wheel driven sprocket 17, whereby the rear wheel Wr is rotated and travels at a speed desired by the person riding on the bicycle B.

Then, the above-described speed change effected by the speed-change mechanism M1 is achieved by the following operation.

In other words, when the person riding on the bicycle B pushes the pedal 13a and rotates the crankshaft 12 in the forward direction P in a state in which the speed-change sprocket 47 is selected from a group of the speed-change sprockets 41-47 as the operating sprocket, that is, in a state in which the seventh position is selected as the speed-change position by the derailleur 60 having the derailleur arm unit 62 at the initial position, which is the position indicated by the solid line in FIG. 6, and FIG. 3 to FIG. 5, that is, at the first position, the drive sprocket 31 is rotated in the forward direction P via the one-way clutch 32 and the sliding mechanism S by the rotation of the crankshaft 12.

The speed-change sprocket 47, the output shaft 15, and the rear wheel drive sprocket 16 are rotated by the drive sprocket 31 driven in the forward direction P via the speed-change chain 48 at a maximum speed-change ratio on the high-speed side determined by the both sprockets 31, 47.

The motive power of the crankshaft 12 rotated by the person riding on the bicycle B is transmitted to the output shaft 15 via the drive sprocket 31, the speed-change chain 48 and the speed-change sprocket 47, and the motive power of the output shaft 15 is transmitted to the real wheel Wr via the drive force transmitting mechanism, whereby the bicycle B travels at the seventh speed.

When the speed-change operating member 51 is operated to select the speed-change sprocket on the low-speed side, for example, the speed-change sprocket 41 as the operating sprocket in order to shift the speed position by the derailleur 60 from the position of the seventh speed, the derailleur arm unit 62 of parallel linkage is rotated in the rising direction about the two supporting shafts 62a in pair provided on the protruding portion 61c and intersecting the axis X of the derailleur shaft 61 by a predetermined angle and against a spring force of the compression spring 62b by a pulling force of the operating wire 52, which is the inner cable of the speed-change cable C.

The derailleur arm unit 62 of parallel linkage is moved from the initial position, which is the position indicated by the solid line, to the position indicated by the imaginary line by its rotation, and in association with the movement of the derailleur arm unit 62, the guide pulley 65 at the distal end of the arm is moved from the above-described initial position indicated by the solid line, that is, from the position of the above-described seventh speed, to the position indicated by the imaginary line, that is, to the position of the first speed described above. In the course of movement of the guide pulley 65, the speed-change chain 48 is shifted from the speed-change sprocket 47 to the speed-change sprocket 41 going through the intermediate speed-change sprockets 46-42 in sequence together with the guide pulley 65, and the sprocket 41 is driven and connected to the drive sprocket 31 via the speed-change chain 48.

In other words, the guide pulley 65 at the distal end of the derailleur arm unit 62 is moved from the position indicated by the solid line in FIG. 6, and FIG. 3 to FIG. 5 to the gear position indicated by the imaginary line, and when the guide pulley 65 is at the position indicated by the imaginary line, the speed-change chain 48 is shifted to the sprocket 41 on the minimum speed side, that is, the position of the first speed, whereby the bicycle B travels at the minimum speed, that is, at the first speed.

Then, the movement of the chain 48 in association with the movement of the above-described guide pulley 65 for shifting the speed-change chain 48 exerts a tension of the chain 48 to the drive sprocket 31. On the other hand, since the drive sprocket 31 is movable in the direction of the axis of the crankshaft 12 by the sliding mechanism S as shown in FIG. 3 to FIG. 5 and so on, the drive sprocket 31 is moved by the tension of the speed-change chain 48 in the direction of the axis of the crankshaft 12 or, more specifically, by a component force in the direction of the axis of the crankshaft 12, and is shifted to the position indicated by the imaginary line in FIG. 3 to FIG. 5 and so on.

The tension of the chain 48 generated by the shifting of the speed-change chain 48 in association with the above-described movement of the guide pulley 65 acts on the tensioner pulley 71, and causes the tensioner arm unit 72 to rotate about the supporting shaft 65a of the guide pulley 65 against the spring force of torsion springs 65d, 65e, which are tensioner springs, so that the tensioner pulley 71 journaled at the distal end of the arm unit 72 is translated from the position indicated by the solid line, which is the initial position, to the position indicated by the imaginary line.

The tensioner pulley 71 takes a position to provide a tension of a suitable magnitude to the speed-change chain 48 by the tensioner springs 65d, 65e at its shifted position (see imaginary line in FIG. 6).

On the other hand, when the speed-change operation member 51 is operated to loosen the operating wire 52, which is the inner cable of the speed-change cable C, and any one of the speed-change sprockets 42-47 on the side of the higher speed than the speed-change sprocket 41 is selected as the operating sprocket, the derailleur arm unit 62 of parallel linkage is moved to return to the direction toward the above-described initial position by a spring force of the compression spring 62b which urges the parallel linkage back to the initial state.

Then, by the movement of the guide pulley 65 in association with the translation of the derailleur arm unit 62, the guide pulley 65 selects desired one from the speed-change sprockets 42-47 on the high-speed side, and in association with the selection, the speed-change chain 48 is shifted to the selected desired speed-change sprocket on the high-speed side.

In the above-described gear shift operation from the low-speed side to the high-speed side as well, the drive sprocket 31 supported by the crankshaft 12 via the speed-change chain 48 is moved in the direction of the axis of the crankshaft 12 via the sliding mechanism S as shown in FIG. 3 to FIG. 5 by the action of the tension of the speed-change chain 48 generated by the movement of the guide pulley 65 in association with the translation of the derailleur arm unit 62, and hence is moved to a new gear position in the direction of the axis of the crankshaft 12, that is, to the position corresponding to the desired speed-change sprocket on which the speed-change chain 48 is wound, whereby the bicycle B travels in the desired speed-change ratio at this new gear position.

In brief, when the speed-change operation member 51 is operated for shifting the gear position, the derailleur arm unit 62, the guide pulley 65, and the tensioner pulley 71 are moved toward the desired gear position via the speed-change cable C, and one of the speed-change sprockets is selected from a group of the speed-change sprockets 41-47 by the derailleur 60, whereby the speed-change chain 48 is wound around the selected speed-change sprocket.

Then, the drive sprocket 31 on the axis of the crankshaft 12 is moved to a position corresponding to the selected speed-change sprocket along the crankshaft 12 by the tension of the chain generated when the speed-change chain 48 is shifted, whereby drive connection between the speed-change sprocket and the drive sprocket 31 on the crankshaft 12 is achieved by the speed-change chain 48 aligned at a suitable position without being twisted.

Since this embodiment is configured as described above, and operated as described above, the following specific effects are achieved.

Since the bosses 20L1, 20R1 projecting inwardly from the left and right transmission cases 20L, 20R respectively are provided on the identical axis, and the derailleur shaft 61 of the transmission is supported by the left and right bosses 20L1, 20R1, the derailleur shaft 61 is supported at both ends. Therefore, mounting rigidity of the derailleur shaft 61 is improved, and hence the mounting state of the shaft 61 is extremely stable. Also, since it is not necessary to increase the thickness of the derailleur shaft 61 without necessity, weight reduction of the shaft 61 is achieved, and hence downsizing and weight reduction of the mounting structure itself of the derailleur shaft 61 is achieved.

Since the rigidity of the mounting structure of the derailleur shaft 61 is enhanced, the stable state of the derailleur shaft 61 can be maintained even when an offset load is exerted during the speed-change operation, and hence improved operability during speed-change operation is resulted. In addition, since the connecting portion between the left and right transmission cases 20L, 20R can be used also as the supporting portion of the derailleur shaft 61, simplification of the case structure is achieved.

Since the left and right bosses 20L, 20R are respectively formed with the holes 20L2, 20R2 inside thereof, and the tightening bolts Bo for connecting the left and right transmission cases 20L, 20R are fitted into the holes 20L2, 20R2, the left and right cases 20L, 20R are strongly connected to each other via the bosses 20L1, 20R1 by the tightening bolts Bo fitted into the holes 20L2, 20R2 of the left and right bosses 20L1, 20R1, and the derailleur shaft 61 is supported by the both bosses 20L1, 20R1 strongly connected. Therefore, rigidity of the supporting portion of the shaft 61 is enhanced, whereby support of the derailleur shaft 61 becomes extremely strong and stable irrespective of its simple supporting structure.

Since the derailleur shaft 61 is provided with the hole 61*b* at the shaft-end projection 61*a* and the mounting position with respect to the transmission case 20L is determined by the stopper pin 61A inserted into the hole 61*b*, the mounting accuracy is improved, and positioning at the time of mounting is extremely easy. Since the tightening bolt Bo is disposed inwardly of the width of the transmission case 20, it does not project in the direction of the width of the case 20.

The derailleur arm unit 62 includes a pair of the arms 62A, 62B of parallel linkage, and arm is attached to the derailleur shaft 61 while being rotatably supported via the supporting shaft 62*a* whose axis Y is oriented so as to intersect the axis X of the derailleur shaft 61 at a predetermined angle. Desired speed-change sprocket is selected by the movement of the guide pulley 65 in association with the rotation of the arm unit 62 by pulling or slackening of the operating wire 52 of the speed-change cable C at the time of speed-change operation, and shifting of the speed-change chain 48 is achieved. Therefore, the derailleur 60 is adequately and reliably guided by such a mounting structure, and smooth movement of the derailleur 60 for speed change is ensured.

Since mounting of the derailleur 60 to the derailleur shaft 61 is achieved by the derailleur arm unit 62 having a simple structure including a pair of the arms 62A, 62B of parallel linkage as described above, and the operation for moving the derailleur 60 is also simple, little mechanical operation loss due to frictional force or the like occurs during operation. Therefore, the operating force of the operating wire 52 of the speed-change cable C can be significantly reduced, and hence smooth speed-change operation can be achieved with a relatively small operating force.

Since the supporting shaft 65*a* of the guide pulley 65 mounted to the distal end of the derailleur arm unit 62 extends in parallel with the derailleur arm shaft 61, guiding of the chain 48 for shifting the speed-change chain 48 during speed-change operation can be achieved smoothly, accurately, and reliably.

By mounting the operating wire 52 which is the inner cable of the speed-change cable C to the mounting portion formed on the outward projection 62B2 on the side end of one of the arms 62B of the derailleur arm unit 62, inserting the wire 52 from the side cutting groove 62B6 of the mounting hole 62B3 opened on the projection 62B2, and strongly pulling the wire portion 52*b* extended from the mounting hole 62B3, the protruded portion 52*a* of the wire end comes into abutment with the shoulder of the hole, and mounted to the outward projection 62B2 of the derailleur arm 62B. Therefore, mounting is achieved extremely easily and the operability for mounting is extremely good.

Since the wire extension 52*b* extended from the operating wire mounting hole 62B3 at the side end of the derailleur arm 62B extends straight toward the substantially upper front of the vehicle body, and is inserted into the outer cable 53 at the mounting hole 61*e* of the outer cable 53 of the derailleur shaft 61, the speed-change cable C is extended from the through hole 20L1 on the upper portion of the transmission case 20L substantially straightly toward the speed-change operation mechanism 50 of the handle. Therefore, the length of the speed-change cable C is significantly reduced, and since the cable C does not form a curved portion which is forcedly bent, there is little friction between the operating wire 52, which is the inner cable, and the outer cable 53, and hence smooth movement of the operating wire 52 is ensured, whereby the speed-change operating load on the operating wire 52 is significantly reduced.

Since a structure in which the lower ends of the mainframe 2 and the down tube 3 are connected by the under tube 4 with respect to each other is employed as the structure of the frame F of the bicycle B, the rigidity of the frame F is enhanced, and the transmission case 20 supported by the frame F is mounted and supported by the lower end of the rear portion of the mainframe 2 and the under tube 4 at the structural portion surrounded by the mainframe 2, the down tube 3, and the under tube 4. Therefore, strong and stable mounting is achieved.

Since the bicycle B on which the transmission according to the present invention is mounted is a down-hill bicycle used for a competitive sport for competing time for running down a dirt course such as a forest road provided with a high-speed corner or a jumping section, when the bicycle B is traveling along the sharp curve, the speed-change chain 48 wound around the drive sprocket unit 30 and the speed-change sprocket unit 40 is shifted by a centrifugal force in the opposite direction from the direction in which the bicycle B turns, and hence may come off the teeth of the drive sprocket 31 of the drive sprocket unit 30. In addition, the bicycle B may be moved heavily in the vertical direction due to the roughness of the traveling surface, and hence the speed-change chain 48 may come off the drive sprocket 31.

However, coming off of the speed-change chain 48 as described above may be prevented by the chain guides 37 provided on both sides of the outer periphery of the drive sprocket 31 shown in FIG. 3 to FIG. 5 and so on.

During travel of the bicycle B, when the crankshaft 12 is turned in the reverse direction or stopped by the person riding on the bicycle B, the bicycle B travel by inertia, and in particular, when it is running down on the downhill, the bicycle B continue to travel and hence the rear wheel Wr continues to rotate. However, in the embodiment of the present invention, there is a friction member such as an O-ring interposed between the hub Wr1 of the rear wheel Wr and the driven sprocket 17, and the rear wheel hub Wr1 and the driven sprocket 17 are frictionally connected to each other via the friction member.

Therefore, during the inertia traveling of the bicycle B, the rotation of the rear wheel Wr is transmitted from the rear wheel Wr to the rear wheel driven sprocket 17, the rear wheel drive chain 18, the rear wheel drive sprocket 16, and the output shaft 15, the speed-change sprocket unit 40, the speed-change chain 48, and hence the speed-change chain 48 is positively rotated even during the inertial traveling, shifting of the chain 48 can be performed easily, and the speed-change operation during the inertial traveling can be performed easily.

In this embodiment, since the chain alignment mechanism 80 shown in FIGS. 15, 16 is provided, the speed-change chain 48 which is slackened on the side of the speed-change sprocket unit 40 of the chain guide member 81 is linearly aligned at the throat portion 87, and is guided by the drive sprocket 31 smoothly.

When the drive sprocket 31 is passively rotated during inertia traveling, there may be the case in which smooth movement of the chain 48 is not ensured when the traveling surface has minute fluctuations or when the person riding on the bicycle B suddenly stops pushing of the pedals irrespective of provision of the tension by the tensioner spring of the chain tensioner 70 to the speed-change chain 48. However, since the chain guide member 81 is provided, occurrence of such event can be prevented reliably in advance.

As shown in FIG. 15, there may be the case that the speed-change chain 48 is slackened by being pressed from the delivery side on the lower side of the speed-change sprocket unit 40 to the retracting side of the drive sprocket 31, or by being caught into the retracting side of the drive sprocket 31 due to such slackening, so that the speed-change chain 48 cannot be retracted smoothly. However, since the speed-change chain 48, which is slackened on the side of the speed-change sprocket unit 40 of the chain guide member 81, is linearly aligned at the throat portion 87, the chain 48 is smoothly guided and wound around the drive sprocket 31 (see also FIG. 16).

The chain guide member 81 is, as shown in FIGS. 15 and 16, disposed at the midpoint between the speed-change sprocket unit 40 and the drive sprocket 31, and the surfaces of the upper and lower guide members 82, 83 on the side of passage of the chain extend in parallel with each other when viewed in the direction of movement of the speed-change chain 48, and is formed so that the width sufficient for allowing the speed-change chain 48 to pass through is secured. Therefore, even when the speed-change chain 48 is moved in the direction of the axis of the output shaft when shifting the speed-change chain 48, the speed-change chain 48 can be guided smoothly.

Since the distal end of the upper guide member 82 on the side of the speed-change sprocket unit 40 is formed with an inclined comb-shaped portion 86, the respective comb teeth are inserted into the gaps between the adjacent speed-change sprockets 41-47, and hence when shifting the speed-change chain 48, upward movement of the speed-change chain 48 is reliably limited to deliver the speed-change chain 48 toward the drive sprocket 31 smoothly.

Since the throat portion 87 for limiting the position of the speed-change chain 48 passing therethrough in the vertical direction into a narrow space is provided on the side of the drive sprocket 31 of the chain guide member 81, the speed-change chain 48 delivered from the throat portion 87 can arrive the serrated position of the drive sprocket 31 in a tangential state.

Furthermore, in this embodiment, since the tension adjusting mechanism 90 for adjusting the tension of the rear wheel drive chain 18 shown in FIG. 17 is provided, the slackening due to extension of the rear wheel drive chain 18 can be adjusted as needed, and smooth chain drive is ensured. Since the chain tension adjusting mechanism 90 is provided at the position adjacent to the passage of the rear wheel drive chain 18 below the rear portion of the mainframe 2, a sufficient working space is ensured, and hence the operation for adjustment can be performed easily and good operability is achieved.

The chain tension adjusting mechanism 90 is simple in structure, and the operation for tension adjustment of the chain 18 can be performed easily by simply loosening the tightening bolt 93 and rotating the adjust bolt 96. Therefore, rapid and adequate adjustment operation of the chain can be performed extremely efficiently irrespective of its simple structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A derailleur-type transmission for a bicycle, the transmission being mountable to a frame of the bicycle, said transmission comprising:
   a transmission case, said transmission case being dividable into left and right cases, the left and right cases of the transmission case being provided with left and right bosses, respectively, the left and right bosses coaxially projecting inwardly of the transmission case;
   a derailleur shaft, said derailleur shaft surrounding the left and right bosses and being supported by the left and right bosses; and
   a derailleur mounted to an outer periphery of said derailleur shaft and disposed inside of the transmission case,
   wherein the left and right bosses are formed with holes therein, and the left and right halves of the transmission case are connected via a connecting member fitted into the holes; and
   wherein the width of the left case is different from the width of the right case, the boss on the side of a wider one of the left and right cases has a longer projecting length and is provided with a through-hole, while the boss on the side of the narrower case has a shorter projecting length and is provided with a blind hole, the blind hole is formed with female threads, and the connecting member has male threads that are threaded with the female threads.

2. The derailleur-type transmission according to claim 1, wherein the derailleur shaft is disposed substantially at the same distance from a plurality of the frame members extending from a head pipe of the frame of the bicycle rearward and downward in a side view of the bicycle.

3. The derailleur-type transmission according to claim 1, wherein the left and right bosses have a different projecting length.

4. The derailleur-type transmission according to claim 1, wherein an inner circumferential surface of the derailleur shaft surrounds the left and right bosses.

5. The derailleur-type transmission according to claim 1, wherein a projecting end of the left boss and a projecting end of the right boss abut against each other.

6. A bicycle, comprising: a frame, said frame including a pair of left and right main frames extending from a head pipe rearward and obliquely downward, a down tube extending from front lower ends of the pair of main frames rearward and obliquely downward, a saddle frame extending rearward from for the pair of mainframes;
   a saddle, said saddle being supported by the saddle frame;

a pair of left and right front forks, said pair of front forks being supported by the head pipe and supporting a front wheel;

a pair of left and right swing arms, said pair of swing arms being supported by the main frames and supporting a rear wheel; and a derailleur-type transmission, the transmission being mounted to the frame, said transmission including:

a transmission case, said transmission case being dividable into left and right cases, the left and right cases of the transmission case being provided with left and right bosses, respectively, the left and right bosses coaxially projecting inwardly of the transmission case;

a derailleur shaft, said derailleur shaft surrounding the left and right bosses and being supported by the left and right bosses; and a derailleur mounted to an outer periphery of said derailleur shaft and disposed inside of the transmission case, wherein a projecting end of the left boss and a projecting end of the right boss abut against each other.

7. The bicycle according to claim 6, wherein the left and right bosses are formed with holes therein, and the left and right halves of the transmission case are connected via a connecting member fitted into the holes.

8. The bicycle according to claim 7, wherein the derailleur shaft is disposed substantially at the same distance from a plurality of frame members extending from the head pipe of the body of the bicycle rearward and downward in a side view of the bicycle.

9. The bicycle according to claim 6, wherein the left and right bosses have a different projecting length.

10. The bicycle according to claim 7, wherein the width of the left case is different from the width of the right case, the boss on the side of a wider one of the left and right cases has a longer projecting length and is provided with a through-hole, while the boss on the side of the narrower case has a shorter projecting length and is provided with a blind hole, the blind hole is formed with female threads, and the connecting member has male threads that are threaded with the female threads.

11. The bicycle according to claim 6, wherein an inner circumferential surface of the derailleur shaft surrounds the left and right bosses.

12. A bicycle, comprising:

a frame, said frame including a pair of left and right main frames extending from a head pipe rearward and obliquely downward, a down tube extending from front lower ends of the pair of main frames rearward and obliquely downward, a saddle frame extending rearward from for the pair of mainframes;

a saddle, said saddle being supported by the saddle frame;

a pair of left and right front forks, said pair of front forks being supported by the head pipe and supporting a front wheel;

a pair of left and right swing arms, said pair of swing arms being supported by the main frames and supporting a rear wheel; and a derailleur-type transmission, the transmission being mounted to the frame, said transmission including:

a transmission case, said transmission case being dividable into left and right cases, the left and right cases of the transmission case being provided with left and right bosses, respectively, the left and right bosses coaxially projecting inwardly of the transmission case; and a derailleur shaft, said derailleur shaft being supported by the left and right bosses, wherein said derailleur shaft is in the shape of a hollow sleeve and is fitted on an outer periphery of the left and right bosses;

wherein a derailleur mounted to an outer periphery of said derailleur shaft and disposed inside of the transmission case; and wherein a projecting end of the left boss and a projecting end of the right boss abut against each other.

13. A bicycle, comprising:

a frame, said frame including a pair of left and right main frames extending from a head pipe rearward and obliquely downward, a down tube extending from front lower ends of the pair of main frames rearward and obliquely downward, a saddle frame extending rearward from for the pair of mainframes;

a saddle, said saddle being supported by the saddle frame;

a pair of left and right front forks, said pair of front forks being supported by the head pipe and supporting a front wheel;

a pair of left and right swing arms, said pair of swing arms being supported by the main frames and supporting a rear wheel; and a derailleur-type transmission, the transmission being mounted to the frame, said transmission including:

a transmission case, said transmission case being dividable into left and right cases, the left and right cases of the transmission case being provided with left and right bosses, respectively, the left and right bosses coaxially projecting inwardly of the transmission case; and a derailleur shaft, said derailleur shaft being supported by the left and right bosses, wherein said derailleur shaft includes a protruding portion extending from an outer surface thereof, said protruding portion having a pair of through holes formed therethrough, said through holes receiving a pair of supporting shafts that support a derailleur arm unit and a derailleur;

wherein said derailleur arm unit and said derailleur are disposed inside of the transmission case;

wherein an inner circumferential surface of the derailleur shaft surrounds the left and right bosses; and wherein a projecting end of the left boss and a projecting end of the right boss abut against each other.

14. The bicycle according to claim 13, wherein the pair of through holes have axis that extend in parallel to each other, the axis of the through holes extend in a direction intersecting an axis of the derailleur shaft at a predetermined angle.

15. The bicycle according to claim 14, wherein said derailleur shaft is in the shape of a hollow sleeve and is fitted on an outer periphery of the left and right bosses.

* * * * *